United States Patent [19]
Takasaki

[11] Patent Number: 5,848,305
[45] Date of Patent: Dec. 8, 1998

[54] CIRCULATING SHIFT REGISTER AND DISTANCE MEASURING DEVICE

[75] Inventor: Minoru Takasaki, Yokohama, Japan

[73] Assignee: Canon Kabushiki Kaisha, Tokyo, Japan

[21] Appl. No.: 791,702

[22] Filed: Jan. 30, 1997

[30] Foreign Application Priority Data

| Jan. 31, 1996 | [JP] | Japan | 8-016077 |
|---|---|---|---|
| Jan. 31, 1996 | [JP] | Japan | 8-016083 |

[51] Int. Cl.[6] .......................... G03B 13/18; G03B 13/32
[52] U.S. Cl. .............................. 396/96; 377/57; 377/58; 377/63
[58] Field of Search ........................ 396/96; 377/57, 377/58, 63

[56] References Cited

U.S. PATENT DOCUMENTS

| 4,437,743 | 3/1984 | Sakai et al. | 396/96 |
|---|---|---|---|
| 4,470,676 | 9/1984 | Kinoshita et al. | 396/93 |
| 4,843,417 | 6/1989 | Ishida et al. | 396/100 |
| 5,028,948 | 7/1991 | Yamasaki | 396/96 |
| 5,565,954 | 10/1996 | Ishiguro | 396/126 |
| 5,591,960 | 1/1997 | Furukawa et al. | 250/208.1 |
| 5,666,567 | 9/1997 | Kusaka | 396/96 |
| 5,708,871 | 1/1998 | Hamada et al. | 396/96 |

*Primary Examiner*—Russell Adams
*Attorney, Agent, or Firm*—Morgan & Finnegan LLP

[57] ABSTRACT

When a voltage signal corresponding to charges circulating a circulating shift register including charge transfer channels, which are arranged in a ring pattern, are read out from the shift register as a signal value, since clocks for circulating the charges have a very high frequency, it is difficult to operate an A/D converter in synchronism with such clocks, and a very expensive A/D converter must be used. In view of this problem, when the signal is read out, the clock frequency is lowered, and the voltage signal corresponding to the charges is converted into a digital value using an A/D converter that operates at low speed. When a distance measuring device is configured using the circulating shift register, charges corresponding to an image are shifted by the circulating shift register. In this case, since the shift efficiency is less than 100%, the amount of charges immediately after a non-charge portion decreases as they are shifted, and such charges form a false image. In order to solve this problem, the distance is calculated without using any charges immediately after the non-charge portion.

12 Claims, 17 Drawing Sheets

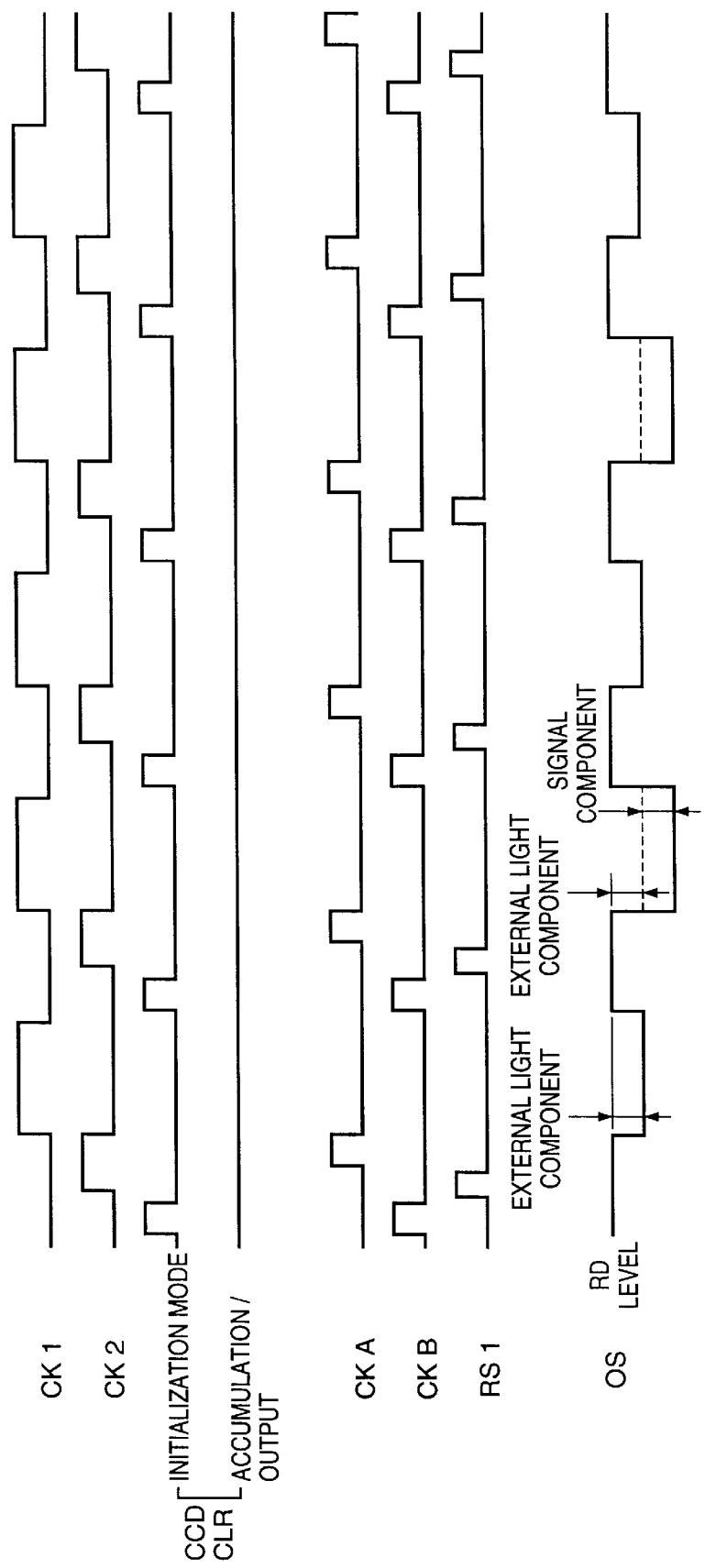

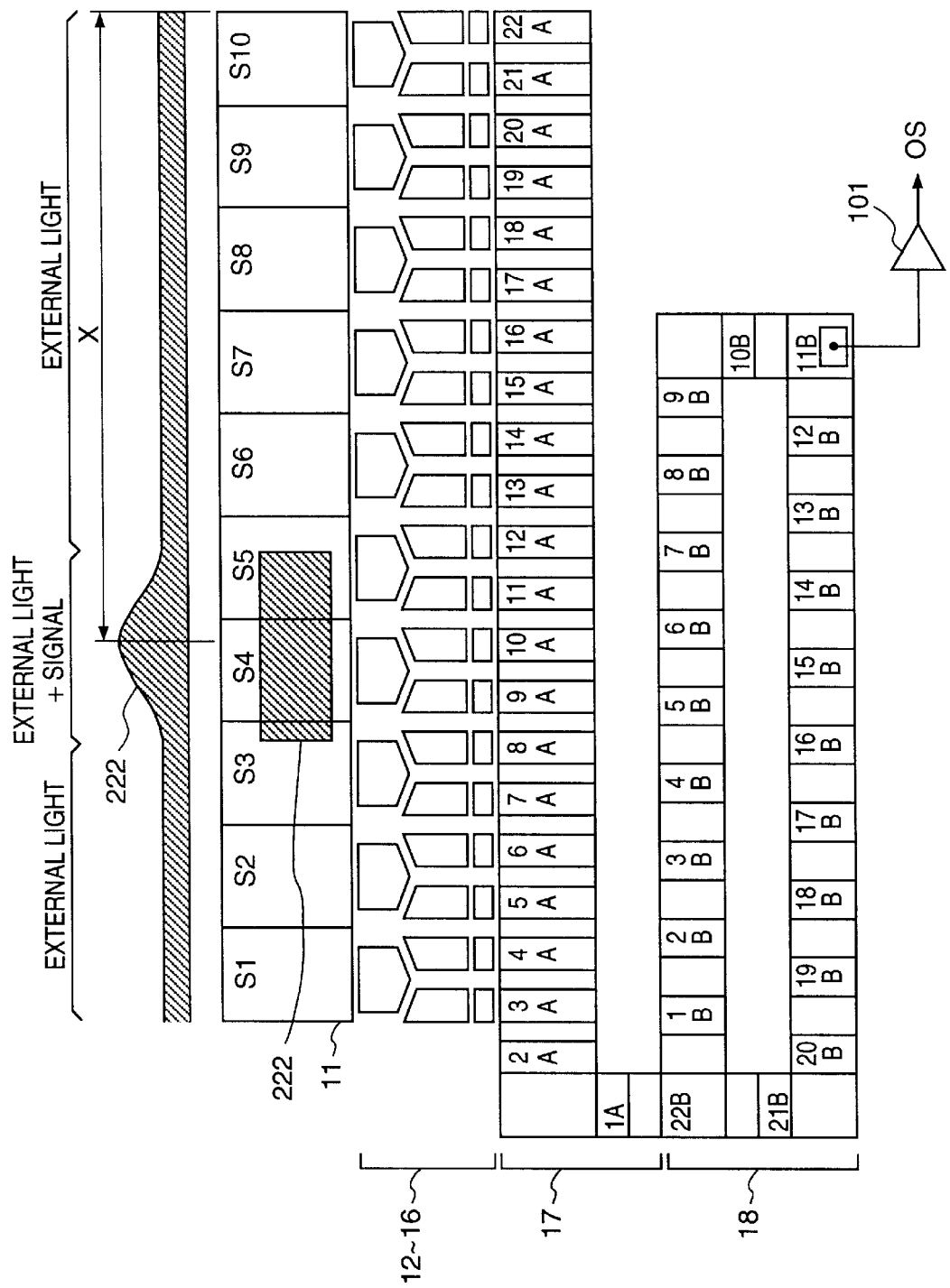

122 (—) TRANSFER EFFICIENCY = 100%
123 (---) TRANSFER EFFICIENCY < 100%

EXECUTE CALCULATION (EXTERNAL LIGHT COMPONENT + SIGNAL COMPONENT) − (EXTERNAL LIGHT COMPONENT)

WHEN TRANSFER EFFICIENCY = 100%

WHEN TRANSFER EFFICIENCY < 100%

IGNORE SIGNAL CHARGE FROM S₁

MORE SPECIFICALLY, CALCULATION IS PERFORMED WHILE SETTING:
· CHARGE OF 3B = 0
· CHARGE OF 4B = 0

132 (—) TRANSFER EFFICIENCY = 100%

133 (---) TRANSFER EFFICIENCY < 100%

EXECUTE CALCULATION (EXTERNAL LIGHT COMPONENT + SIGNAL COMPONENT) − (EXTERNAL LIGHT COMPONENT)

WHEN TRANSFER EFFICIENCY = 100%

WHEN TRANSFER EFFICIENCY < 100%

IGNORE SIGNAL CHARGE FROM $S_1, S_2$

MORE SPECIFICALLY, CALCULATION IS PERFORMED WHILE SETTING:
· CHARGE OF $3_B$ = 0
· CHARGE OF $4_B$ = 0
· CHARGE OF $5_B$ = 0
· CHARGE OF $6_B$ = 0

CIRCULATING SHIFT REGISTER AND DISTANCE MEASURING DEVICE

BACKGROUND OF THE INVENTION

The present invention relates to a circulating shift register comprising, e.g., a CCD (Charge Coupled Device) in which a plurality of charge transfer channels are coupled to at least locally have a loop portion, and charges are circulated in the loop portion to be accumulated, and a distance measuring device using the circulating shift register and applied to, e.g., a camera.

Conventionally, a circulating shift register comprising a CCD in which a plurality of charge transfer channel portions are coupled in a loop pattern is known (e.g., Japanese Patent Publication No. 5-22843). In such circulating shift register, the transfer rate of charges of the charge transfer channel portions depends on the clock frequency applied to transfer electrodes provided to the respective charge transfer channel portions. The clock frequency normally falls within the range from 100 kHz to 1 MHz.

On the other hand, a reading device for reading a signal output from such circulating shift register and outputting the read signal to an external device is normally constituted by an A/D converter and a memory circuit. A voltage signal output from an output portion of the circulating shift register is A/D-converted by an A/D converter, and the digital signal is stored in the memory circuit. The digital signal read out from the memory circuit is output to the external device.

However, an A/D converter that can cope with the clock frequency range from 100 kHz to 1 MHz is relatively large in scale and expensive, and is hardly designed as a one-chip integrated circuit.

A distance measuring device described in Japanese Patent Publication No. 5-22843 integrates signals using ring-shaped charge transfer portions, and has, in the ring portion, a skim means for skimming external light. With this device, when signal charges do not have a sufficient level, they are sequentially added while being transferred along the ring portion serving as a circulating shift register, thus obtaining a signal charge with a high S/N ratio.

However, when signal charges circulate the circulating shift register constituted by a CCD (charge coupled device), they gradually remain in the subsequent cells (charge transfer channels) as the signal charges circulate when the transfer efficiency is not 100%. For this reason, the distribution of signal charges injected into the circulating shift register changes little by little as they circulate. As a consequence, upon executing distance measuring calculations, the change in signal charge distribution brings about errors in the calculation result. Especially, when the charge transfer channels of the circulating shift register include a non-signal portion, the charge amount in a charge transfer channel adjacent to the non-signal portion gradually changes. This state will be described below with reference to FIGS. 16A to 16D.

FIG. 16A shows the charge distribution in the circulating shift register before repetition of transfer. A uniform charge amount ① is injected into uniform charge portions 51 to 54 and 61 to 63 (corresponding to, e.g., regions irradiated with external light) of charge transfer channels, and non-signal portions 71 to 74 are formed between adjacent uniform charge portions 51 to 54 and the portions 61 to 63. This circulating shift register leaves 10% signal charges per transfer. More specifically, a charge amount ② which is equal to 10% of the charge amount ① remains in the charge transfer channels at positions before the charge transfer.

At this time, when all the charges are transferred once, the charge distribution changes, as shown in FIG. 16B. More specifically, a charge in the uniform charge portion 51 is transferred to the left neighboring charge transfer channel, and the charge amount of the portion 51 decreases to 90% of the initial charge amount ①.

However, charges in the uniform charge portions 52 to 54 and 61 to 63 remain the same since the charge amount ① transferred from a previous portion, which is equal to 90% of the initial value, and the remaining charge amount ② which is equal to 10% of the initial value are added in each of the portions 52 to 54 and 61 to 63 upon charge transfer. On the other hand, the non-signal portion 71 has the charge amount ② due to the residual charge in the uniform charge portion 63.

After another charge transfer operation, the charge distribution changes, as shown in FIG. 16C. The charge amount in the uniform charge portion 51 decreases to 81% of the initial charge amount ① since it has already decreased to 90% in the state shown in FIG. 16B, and the residual charge amount in the uniform charge portion 51 decreases to 9% of the initial charge amount ①. Since the uniform charge portion 52 leaves 10% charge amount, its charge amount becomes 99% of the initial value by adding 9% from the uniform charge portion 51.

After still another charge transfer operation, the charge distribution changes, as shown in FIG. 16D. More specifically, the charge amount in the uniform charge portion 51 decreases to about 73% of the initial charge amount ①, and the charge amount in the uniform charge portion 52 decreases to about 97% of the initial value. Also, the charge amount in the uniform charge portion 53 slightly decreases. Conversely, charges are gradually stored in the non-signal portions 71 to 73. As described above, when the transfer efficiency of the charge transfer channels is less than 100%, the charge amounts especially in the non-signal portion and the neighboring charge transfer channel gradually change as the transfer operation is repeated, thus increasing distance measurement errors.

SUMMARY OF THE INVENTION

It is the first object of the present invention to provide a circulating shift register which can read a signal using even an inexpensive A/D converter.

It is the second object of the present invention to provide a distance measuring device which has a circulating shift register (ring portion) and can attain accurate distance measurements even when charge transfer channels include a non-signal portion.

In order to achieve the above objects, a circulating shift register of the present invention comprises the following arrangement.

A circulating shift register for circulating a charge, comprises:

a plurality of charge transfer channels having a loop portion, at least a portion of which is arranged in a loop pattern;

a clock generation portion for applying a transfer clock to the plurality of charge transfer channels to transfer the charge in a predetermined direction;

an output portion for outputting a signal corresponding to a charge amount in the predetermined charge transfer channel of the plurality of charge transfer channels as a digital signal; and a control portion for controlling the clock generation portion to set a frequency of the transfer clock output while the output portion outputs the signal to be lower than a frequency while the output portion does not output the signal.

The circulating shift register preferably further comprises a charge injection portion for injecting an externally supplied charge to another predetermined charge transfer channel of the plurality of charge transfer channels, and wherein the control portion controls the charge injection portion not to inject the charge to the charge transfer channel while the output portion outputs the signal.

Preferably, the charge injection portion injects the charge in synchronism with circulation of the charge in the loop portion, and the charge injected from the charge injection portion is accumulated by the charge transfer channel.

The circulating shift register preferably further comprises a skim portion for time-serially skimming a predetermined amount of charge in another predetermined charge transfer channel in the loop portion.

The control portion preferably controls the skim portion not to skim the charge while the output portion outputs the signal.

A distance measuring device of the present invention comprises the following arrangement.

That is, a distance measuring device for measuring a distance to an object, comprises:

an imaging portion for forming an image of light reflected by the object on an array of a plurality of photoelectric conversion elements;

a charge shift portion for shifting charges corresponding to the image supplied from the photoelectric conversion elements in an array direction of the photoelectric conversion elements;

a signal output portion for outputting values corresponding to the charges shifted by the charge shift portion; and a distance calculation portion for removing the value corresponding to the charge supplied from at least one photoelectric conversion element at an end in the shift direction from the values output from the signal output portion in accordance with a predetermined condition, calculating a position of the image of the object on the photoelectric conversion elements on the basis of the remaining values, and calculating the distance to the object on the basis of the calculated position.

Preferably, the distance calculation portion unconditionally removes the value corresponding to the charge supplied from the at least one photoelectric conversion element at the end in the shift direction, calculates the position of the image of the object on the photoelectric conversion elements on the basis of the remaining values, and calculates the distance to the object on the basis of the calculated position.

Preferably, the charge shift portion includes a loop portion for circulating the shifted charges, and the distance calculation portion removes the value corresponding to the charge supplied from the at least one photoelectric conversion element at the end in the shift direction when the number of times of circulation of the charges around the loop portion becomes not less than a predetermined value, calculates the position of the image of the object on the photoelectric conversion elements on the basis of the remaining values, and calculates the distance to the object on the basis of the calculated position.

The distance calculation portion preferably changes the number of photoelectric conversion elements corresponding to the value to be removed, in accordance with the number of times of circulation of the charges around the loop portion.

The distance measuring device preferably further comprises a light projection portion for projecting light onto the object by repeating flickering every time the charges go around the loop portion, and wherein each of the photoelectric conversion elements supplies a charge corresponding to an image including reflected light of the light projected from the light projection portion and a charge corresponding to an image including no reflected light to the charge shift portion, and the distance calculation portion calculates a difference between values corresponding to the two different charges to obtain a position of an image formed by only light projected from the light projection portion, and calculates the distance to the object on the basis of the obtained position.

Preferably, the imaging portion forms images of the object at least at two positions separated by a predetermined distance, the charge shift portion shifts charges corresponding to the images at the two positions, and the distance calculation portion calculates the distance on the basis of values corresponding to the images at the two positions.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 6 is a timing chart showing the operation timing of an output portion of the circulating shift register according to the first embodiment of the present invention;

FIG. 11 is a view showing the principal part of the distance measuring device according to the first embodiment of the present invention;

DETAILED DESCRIPTION OF THE PREFERRED EMBODIMENTS

[FIRST EMBODIMENT]

The preferred embodiments of the present invention will be described hereinafter.

Figure 1:
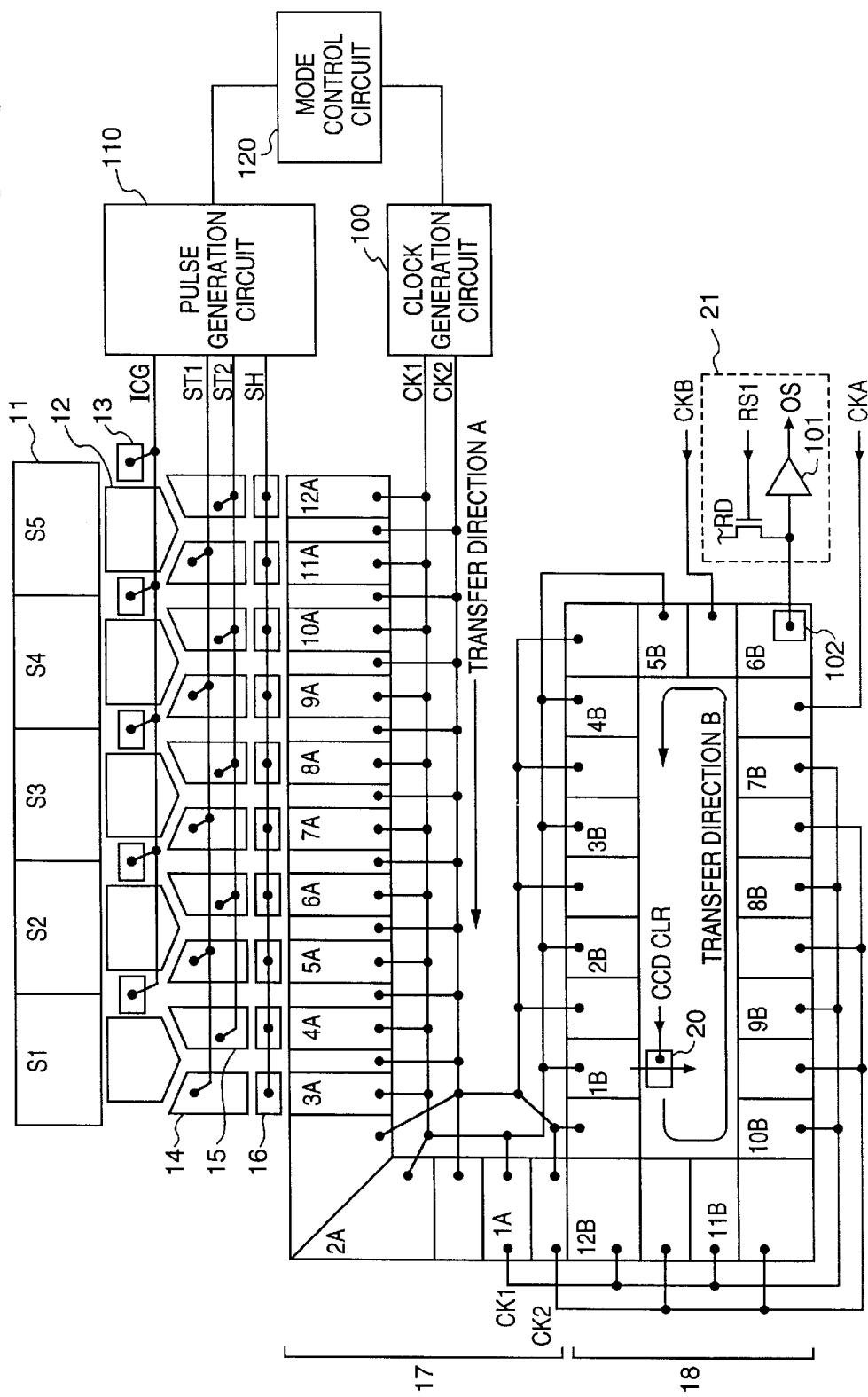
FIG. 1 is a schematic diagram showing the arrangement of a circulating shift register according to the first embodiment of the present invention.

FIG. 1 shows the arrangement of a circulating shift register according to the first embodiment of the present invention, which is built in an auto-focusing unit of a camera.

Referring to FIG. 1, a sensor array 11 has photosensors $S_1$ to $S_5$, which convert optical signals into charge signals. Note that the number of elements of the sensor array 11 is not limited to five in this embodiment.

Integral portions 12 integrate the charge signals photoelectrically converted by the photosensors $S_1$ to $S_5$. Clear portions 13 clear the charge signals accumulated in the respective integral portions 12 upon application of a pulse ICG at a predetermined timing.

First and second accumulation portions 14 and 15 receive the charge signals from the integral portions 12 upon application of pulses $ST_1$ and $ST_2$, respectively.

Shift portions 16 serving as charge injection means to a linear CCD 17 transfer the charge signals stored in the first and second accumulation portions 14 and 15 to the linear CCD 17 upon application of a pulse SH.

The linear CCD 17 comprises a CCD constituted by serially connecting 12 stages of charge transfer channels $1_A$ to $12_A$. The linear CCD 17 is driven by two-phase clock pulses (transfer clocks) $CK_1$ and $CK_2$ applied to transfer electrodes formed on the respective charge transfer channels, and transfers the charge signals injected from the shift portion 16 in a transfer direction A. Note that the linear CCD 17 and a ring CCD 18 (to be described below) may comprise a three-phase CCD driven by three-phase clock pulses, a four-phase CCD driven by four-phase clock pulses, or the like.

The ring CCD 18 comprises a CCD obtained by serially connecting, e.g., 12 stages of charge transfer channels $1_B$ to $12_B$ in a loop pattern. The ring CCD 18 is also driven by the transfer clocks $CK_1$ and $CK_2$ applied to transfer electrodes formed on the charge transfer channels, and transfers the charge signals transferred from the linear CCD 17 in a transfer direction B. More specifically, the charge signals are cyclically transferred through the ring CCD 18, and are added at the charge transfer channel $12_B$ to charge signals newly transferred from the linear CCD 17. At this time, since the linear CCD 17 has the same number of charge transfer channels as that of the ring CCD 18 and the linear CCD 17 and the ring CCD 18 are driven by identical transfer clocks $CK_1$ and $CK_2$, charge signals respectively corresponding to the charge transfer channels $1_A$ and $1_B$, $2_A$ and $2_B$, ..., $12_A$ and $12_B$ are always added to each other.

A CCD clear portion 20 clears the charge signal in the charge transfer channel $1_B$ upon application of a signal CCDCLR. Therefore, when the CCD clear portion 20 operates while the transfer operation is being executed by applying the transfer clocks $CK_1$ and $CK_2$, all the charge signals in the linear CCD 17 and the ring CCD 18 can be cleared (set in the reset state).

An output portion 21 converts the charge amount present in the charge transfer channel $6_B$ into a voltage via a floating gate electrode 102 formed on the charge transfer channel $6_B$, and outputs the voltage as a signal OS from an output amplifier 101. When a pulse $RS_1$ is applied to a transfer gate in the output portion 21, the floating gate electrode 102 is reset to a reset potential RD.

Note that a clock generation circuit 100 shown in FIG. 1 generates transfer clocks $CK_1$ and $CK_2$. A pulse generation circuit 110 generates various kinds of pulses such as pulses ICG, $ST_1$, $ST_2$, SH, and the like. A mode control circuit 120 controls the clock generation circuit 100 and the pulse generation circuit 110 in accordance with the current mode, e.g., the accumulation mode or the output mode of the circulating shift register. Also, reference symbols $CK_A$ and $CK_B$ denote read clocks synchronized with the transfer clocks $CK_1$ and $CK_2$, respectively.

Figure 2:
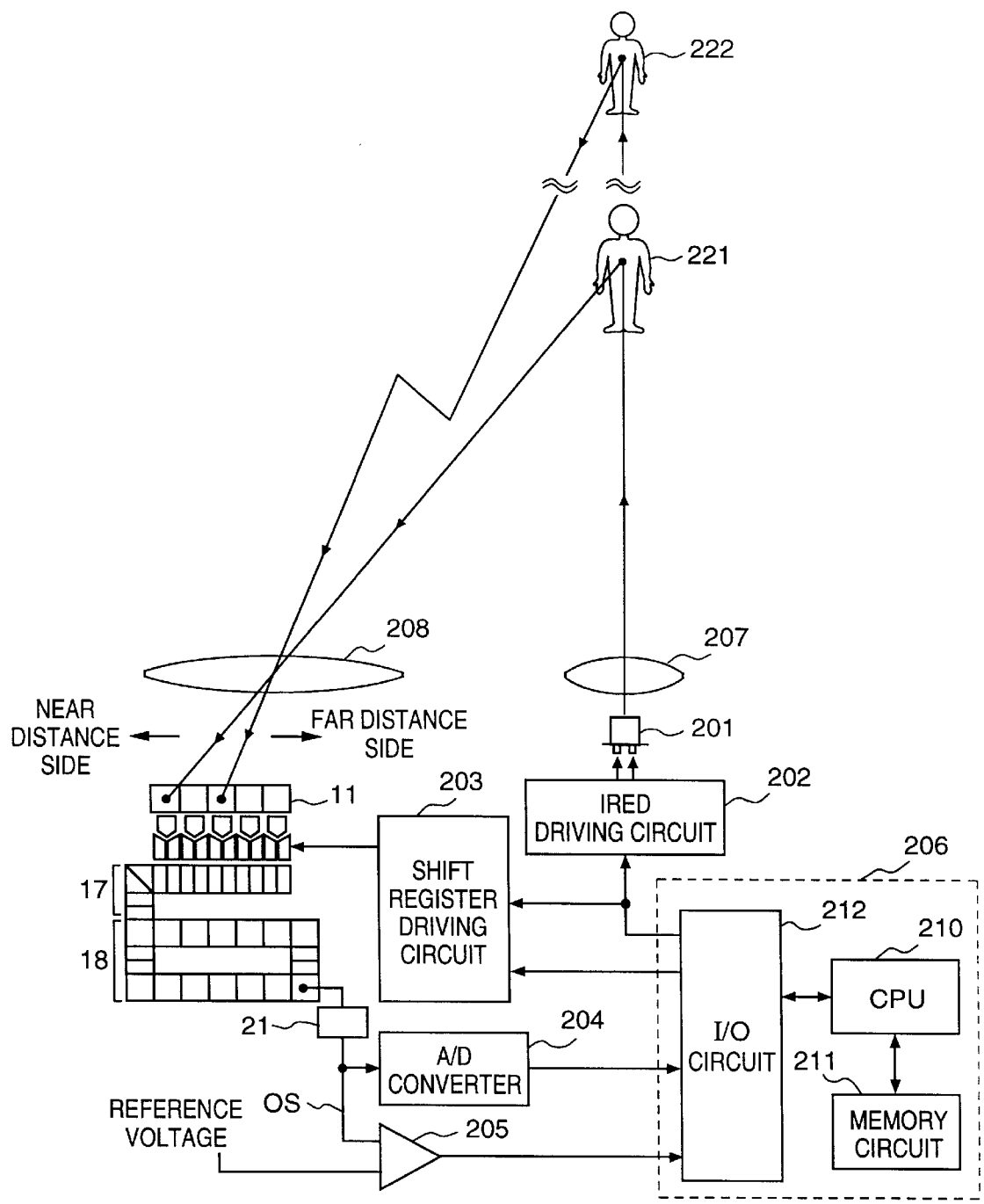
FIG. 2 is a schematic diagram showing the arrangement used when the circulating shift register according to the first embodiment of the present invention is applied to an autofocusing mechanism of a camera.

FIG. 2 shows the arrangement of the auto-focusing unit of the camera, in which the above-mentioned circulating shift register is built.

Since a camera normally copes with a broad object range from an object at near distance and having high reflectance to an object at far distance and having low reflectance, the signal processed by the auto-focusing unit have a very broad dynamic range (normally, about 1:1000). Since it is generally difficult to assure a sufficiently broad dynamic range in a signal processing circuit of the auto-focusing unit, various means for broadening the dynamic range have been proposed. In the circulating shift register of this embodiment, a signal level high enough to perform distance measurement calculations is obtained by the accumulation operation using the ring CCD. If a signal converted by the sensor array has a sufficient level, the accumulation is performed by several circulation of the signal, and if the signal has an insufficient level, the accumulation is performed by several hundred circulation.

As shown in FIG. 2, near-infrared rays emitted by an IRED (InfraRed Emitting Diode) 201 are focused by a projection lens 207, and are irradiated onto an object 221 (near distance) or an object 222 (far distance). Some light components of the near-infrared rays reflected by the object pass through a light-receiving lens 208 and form a received-light image on the sensor array 11. At this time, an image of the object 221 is formed on the sensor portion on the near distance side, or an image of the object 222 is formed on the sensor portion on the far distance side. Therefore, by detecting the sensor portion where the received-light image is formed, the distance to the object can be calculated.

Referring to FIG. 2, an IRED driving circuit 202 drives to flicker the IRED 201 at predetermined cycles.

A shift register driving circuit 203 includes the clock generation circuit 100 and the pulse generation circuit 110 shown in FIG. 1, and generates various pulses for driving the circulating shift register.

An A/D converter 204 A/D-converts a signal OS as the output signal from the circulating shift register.

When the signal OS as the voltage output from the circulating shift register becomes equal to or higher than a predetermined voltage value (reference voltage), a comparator 205 outputs a signal indicating this.

A control circuit 206 comprises a CPU 210, a memory circuit 211, and an I/O circuit 212. The control circuit 206 supplies a signal for causing the IRED 201 to flicker at predetermined cycles to the IRED driving circuit 202, and controls the shift register driving circuit 203 to drive the circulating shift register. More specifically, when the control circuit 206 detects based on the output from the comparator 205 that the ring CCD 18 of the circulating shift register has stored charges in amount equal to or larger than a predetermined value, it stops the accumulation operation and starts a reading operation. The control circuit 206 then calculates the distance to the object using a signal read out from the CCD and output from the A/D converter 204. Note that the mode control circuit 120 shown in FIG. 1 is included in this control circuit 206.

Figure 3:
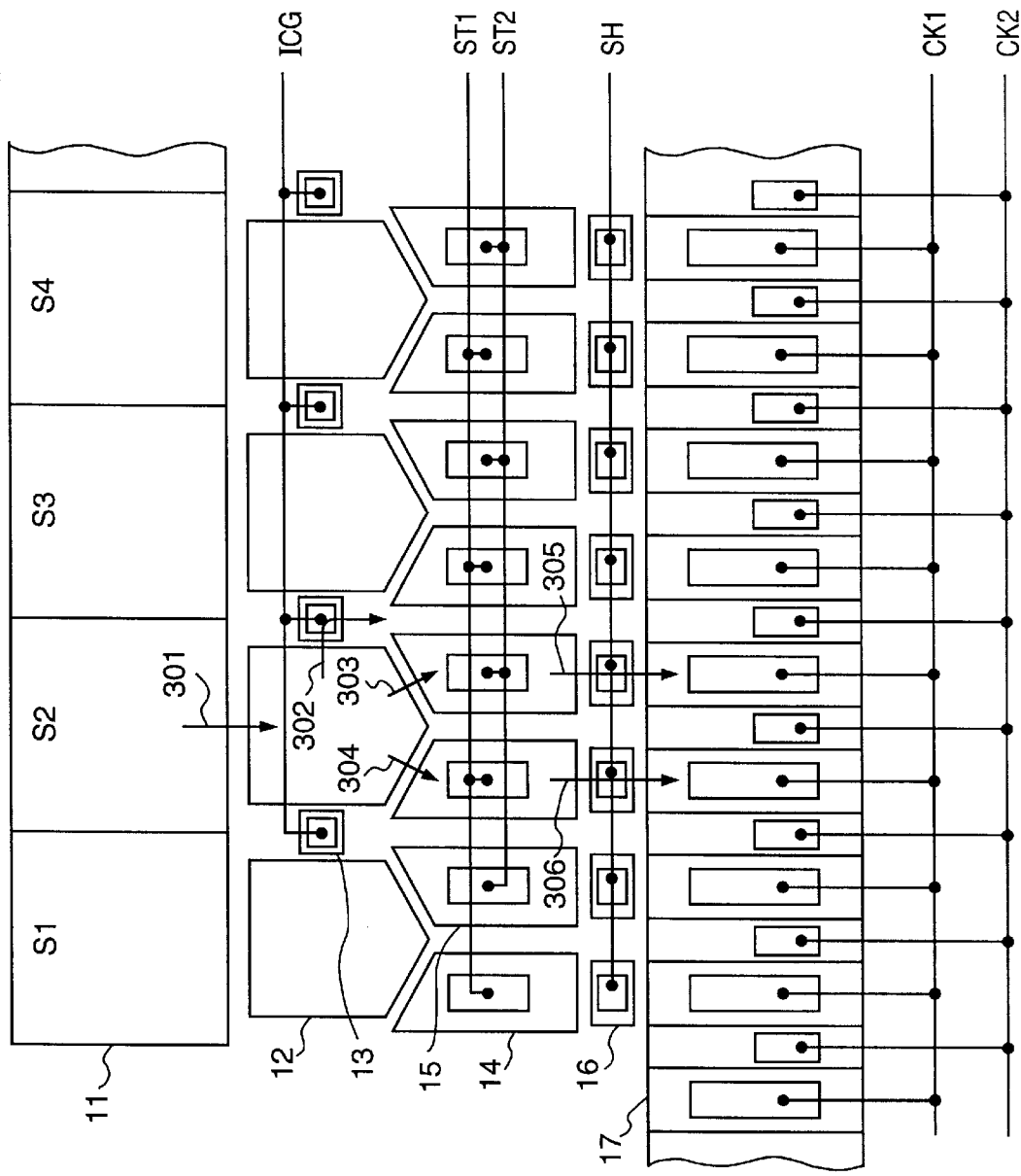
FIG. 3 is an enlarged view showing a portion from a sensor array to a linear CCD in the circulating shift register according to the first embodiment of the present invention.
Figure 4:
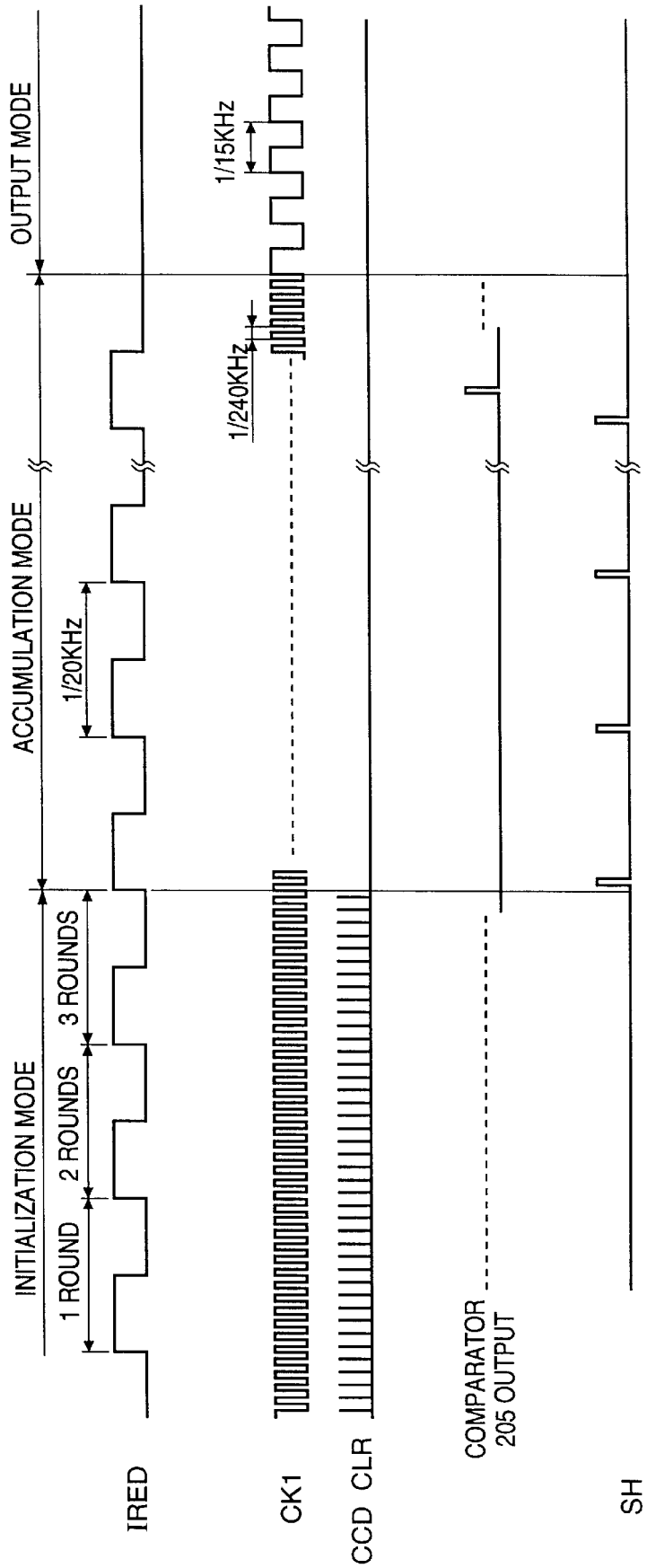
FIG. 4 is a timing chart showing the operation timings in the respective modes of the circulating shift register according to the first embodiment of the present invention.
Figure 5:
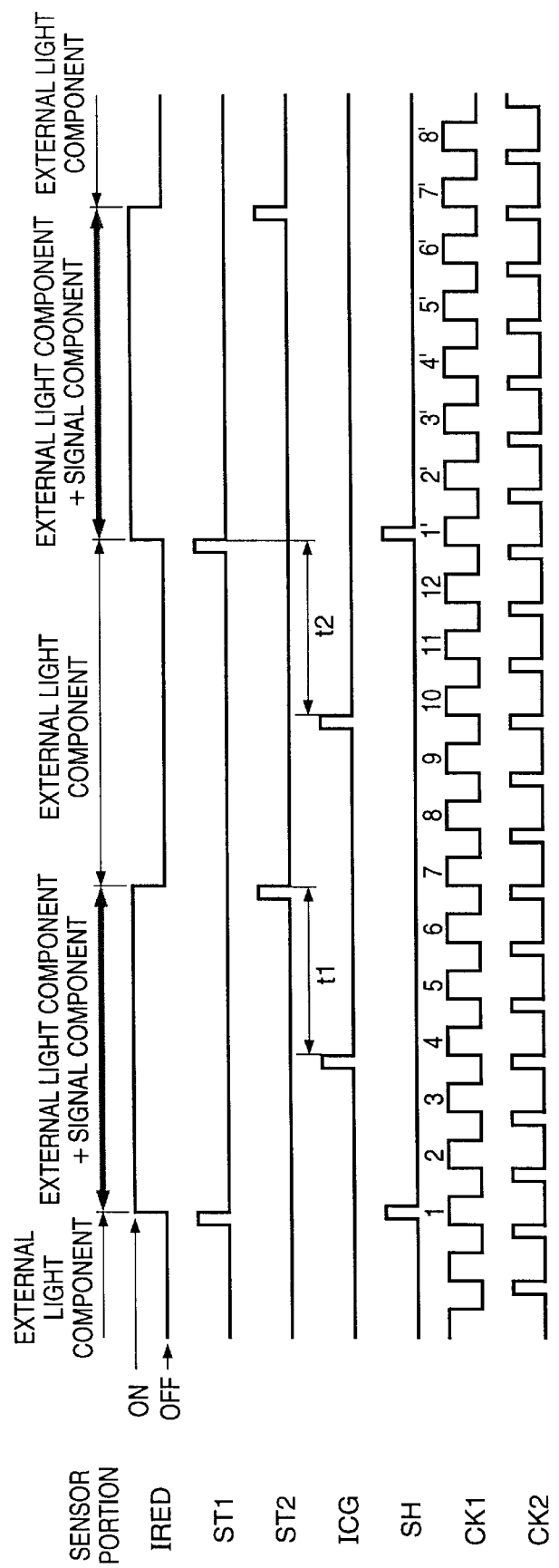
FIG. 5 is a timing chart showing the operation timing in the accumulation mode of the circulating shift register according to the first embodiment of the present invention.

FIG. 3 shows a portion from the sensor array 11 to the linear CCD 17 of the circulating shift register shown in FIG. 1 in an enlarged scale. FIG. 4 shows the operation sequence of the circulating shift register according to the first embodiment, FIG. 5 is an enlarged chart of the accumulation mode in the operation sequence shown in FIG. 4, and FIG. 6 shows the operation timing of the output portion 21.

As shown in FIG. 2, the control circuit 206 drives to flicker the IRED 201 via the IRED driving circuit 202. Infrared rays are irradiated onto the object 221 or 222 via the projection lens 207, and the infrared rays reflected by the object form an image on the sensor array 11 via the light-receiving lens 208. The received-light image also flickers. More specifically, in the ON state of the IRED 201, a received-light image appears on the sensor array 11, and the signal components of the image and external light components are converted into charge signals. However, in the OFF state of the IRED 201, since only external light is irradiated onto the sensor array 11, the obtained charge amount corresponds to only the external light.

As shown in FIG. 3, for example, a charge signal photoelectrically converted by the sensor $S_2$ is supplied to the integral portion 12 via a route indicated by an arrow 301, and is integrated there. At this time, when a pulse ICG is applied to a line ICG connected to the clear portion 13 at the timing shown in FIG. 5, the charge signal present in the integral portion 12 flows onto a ground line (not shown) via a route indicated by an arrow 302. That is, the charge signal in the integral portion 12 is cleared. In this way, by controlling the pulse ICG, the charge accumulation time of the integral portion 12 can be arbitrarily controlled, and hence, the integral portion 12 can serve as a so-called electronic shutter. Time periods $t_1$ and $t_2$ between the pulses ICG, and $ST_1$ and $ST_2$ shown in FIG. 5 correspond to the integral time.

As shown in FIG. 3, the first and second accumulation portions 14 and 15 are provided to each integral portion 12. A charge signal flows from the integral portion into the first accumulation portion 14 via a route indicated by an arrow 304 in response to the pulse $ST_1$ at the timing shown in FIG. 5. On the other hand, a charge signal flows from the integral portion 12 to the second accumulation portion 15 via a route indicated by an arrow 303 in response to the pulse $ST_2$ at the timing shown in FIG. 5.

As shown in FIG. 3, the first and second accumulation portions 14 and 15 are alternately juxtaposed, and the shift portions 16 are arranged therebelow. When a pulse SH is applied to each shift portion 16, a charge signal accumulated in each first accumulation portion 14 is transferred to the charge transfer channel of the linear CCD 17 via a route indicated by an arrow 306, and a charge signal accumulated in each second accumulation portion 15 is transferred to the charge transfer channel via a route indicated by an arrow 305.

At this time, as shown in FIG. 5, since the pulses $ST_1$ are controlled by the control circuit 206 (mode control circuit 120) to be synthesized with the OFF period of the IRED 201, each first accumulation portion 14 accumulates a charge signal corresponding to only external light components always irradiated onto the sensor. On the other hand, since the pulses $ST_2$ are controlled by the control circuit 206 (mode control circuit 120) to be synthesized with the ON period of the IRED 201, each second accumulation portion 15 accumulates a charge signal corresponding to the sum of signal components reflected by the object and external light components. Therefore, the charge signals accumulated in the first and second accumulation portions 14 and 15 are transferred to the charge transfer channels $3_A$ to $12_A$ of the linear CCD 17 shown in FIG. 1 in response to the pulses SH. At this time, the charge signals corresponding to the external light components are transferred to the charge transfer channels $3_A$, $5_A$, $7_A$, $9_A$, and $11_A$, and the charge signals corresponding to the sums of the signal components reflected by the object and the external light components are transferred to the charge transfer channels $4_A$, $6_A$, $8_A$, $10_A$, and $12_A$.

Note that the charge transfer channels $1_A$ and $2_A$ of the linear CCD 17 shown in FIG. 1 are those which are added in association with the arrangements of the linear CCD 17 and the ring CCD 18, and can be used for offset adjustment, dark level detection, and the like.

As shown in FIG. 1, the ring CCD 18 transfers charge signals in the transfer direction B in response to the clock pulses $CK_1$ and $CK_2$. At this time, as shown in FIG. 5, since the pulses SH are synchronized with the cycle of one round of the ring CCD 18, and the ON/OFF cycle of the IRED 201 and the pulses $ST_1$ and $ST_2$ are synchronized with the pulses SH, the charge transfer channels $1_B$ to $12_B$ of the ring CCD 18 always add charge signals transferred from the identical pairs of accumulation portions 14 and 15.

Figure 7A:
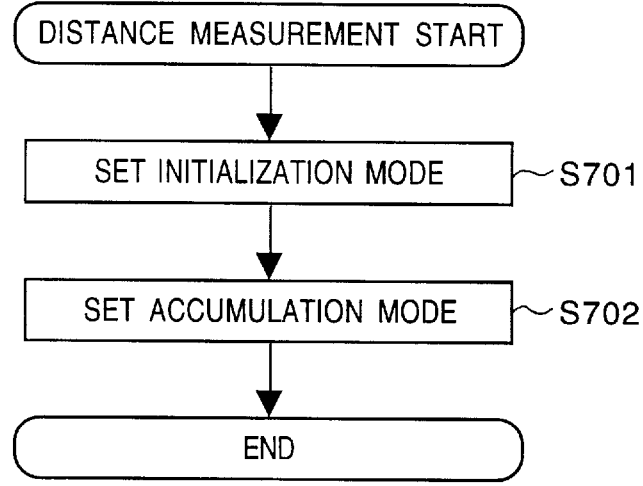
FIG. 7A–B are flow charts showing the operation procedure of a CPU.

The operations in the respective modes will be explained below with reference to FIGS. 4 to 6. Also, the operation of the CPU 210 will be described below with reference to FIGS. 7A and 7B.

As shown in FIG. 4, the CPU 210 sets an initialization mode in the mode control circuit 120 (S701). In the initialization mode, the charge signals in the integral portions are cleared by applying the pulses ICG, and the pulses $ST_1$, $ST_2$, SH, $CK_1$, and $CK_2$ are applied at the predetermined timings shown in FIG. 5. When the pulses CCDCLR are kept applied for a time period required for a charge signal to go around the ring CCD 18 three or more times, all the residual charge signals in the first and second accumulation portions 14 and 15, the linear CCD 17, and the ring CCD 18 are removed via the CCD clear portion 20.

Figure 7B:
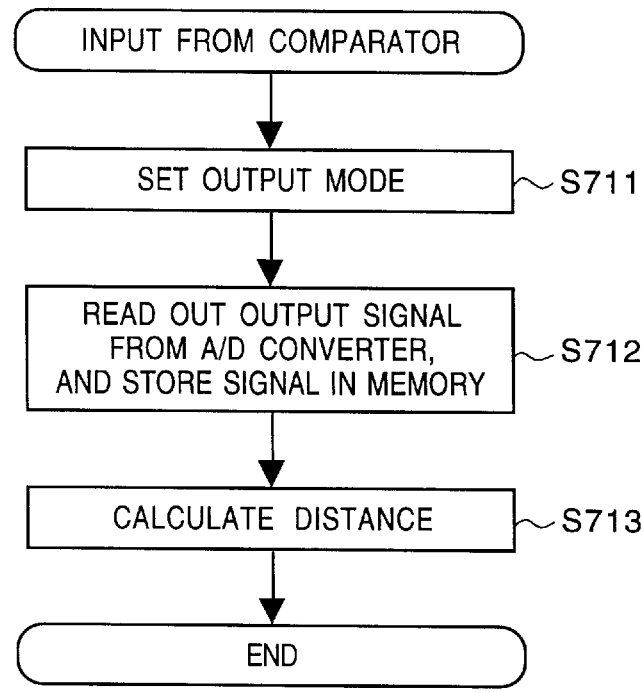

After all the charge signals in the respective portions are perfectly cleared, the pulses CCDCLR are canceled, and the control enters an accumulation mode. For this purpose, the CPU 210 sets the accumulation mode in the mode control circuit 120 (S702). In the accumulation mode, generation of the pulses ICG, $ST_1$, $ST_2$, SH, $CK_1$, and $CK_2$, and the operation of the IRED 201 are performed at the timings shown in FIG. 5. With these operations, charge signals corresponding to external light during the OFF period of the IRED are transferred to the charge transfer channels $3_A$, $5_A$, $7_A$, $9_A$, and $11_A$ of the linear CCD 17 via the first accumulation portions 14, and are sequentially added and stored in the ring CCD 18. Likewise, charge signals corresponding to the sums of signal components reflected by the object and external light components during the ON period of the IRED are transferred to the charge transfer channels $4_A$, $6_A$, $8_A$, $10_A$, and $12_A$ via the second accumulation portions 15, and are sequentially added and stored in the ring CCD 18. When the signal OS as the output signal from the output portion 21 has exceeded the reference voltage of the comparator 205 (see FIG. 2), the procedure shown in FIG. 7B is started in response to the output signal from the comparator. Then, the CPU 210 sets a output mode in the mode control circuit (S711). In the output mode, it is determined that sufficiently large amounts of charge signals are stored in the ring CCD 18, and the charge signals stored in the respective charge transfer channels of the ring CCD 18 are read out. At this time, the reference voltage connected to the comparator 205 is set to be the signal level, so that each charge transfer channel may not be saturated and the A/D converter 204 (see FIG. 2) can perform A/D conversion with sufficiently high precision. In general, the operation speed of a comparator is high, and such comparator can sufficiently cope with discrimination of signals transferred at a transfer clock rate of about 240 kHz like in this embodiment.

In the output mode, as shown in FIG. 2, the A/D converter 204 A/D-converts the signal OS as the output signal from the output portion 21 of the circulating shift register, and the control circuit 206 reads the converted digital signal and writes it in the memory circuit 211 (S712). In order to assure this processing time, the mode control circuit 120 shown in FIG. 1 controls the clock generation circuit 100 to lower the frequency of the clock pulses $CK_1$ and $CK_2$, as shown in FIG. 4. In this embodiment, the frequency is lowered to 15 kHz. However, other values may be determined depending on the processing speeds of the A/D converter 204 and the CPU 210.

FIG. 6 shows the operation timing in the operation portion 21.

In this way, since data to be written in the memory circuit 211 are arranged in the order of (external light components irradiated onto $S_1$), (signal components+external light components irradiated onto $S_1$), (external light components irradiated onto $S_2$), (signal components+external light components irradiated onto $S_2$), . . . , the following calculations can extract only data corresponding to signal components on the sensors $S_1$ to $S_5$:

(signal components + external light components irradiated onto $S_1$) − (external light components irradiated onto $S_1$)
(signal components + external light components irradiated onto $S_2$) − (external light components irradiated onto $S_2$)
(signal components + external light components irradiated onto $S_3$) − (external light components irradiated onto $S_3$)
(signal components + external light components irradiated onto $S_4$) − (external light components irradiated onto $S_4$)
(signal components + external light components irradiated onto $S_5$) − (external light components irradiated onto $S_5$)

As a result of these calculations, it is determined that light reflected by the object is irradiated onto the sensor that outputs the largest signal components, and the distance to the object can be calculated based on the position of the sensor (S713).

In the output mode, the IRED 201 is set in the OFF state to inhibit new signals from being accumulated. Also, in order to prevent charge signals corresponding to external light components from increasing, the mode control circuit 120 shown in FIG. 1 controls the pulse generation circuit 110 to inhibit application of the pulses SH, thereby preventing charge signals corresponding to external light components from being transferred to the linear CCD 17.

According to the first embodiment of the present invention described above, in the circulating shift register that converts external light components irradiated onto the sensors $S_1$ to $S_5$ and signal light components reflected by the object into charge signals and gradually stores the charge signals, the output signals from the output portion 21 based on the charge signals transferred at high speed can be avoided from being directly A/D-converted at that speed. As a consequence, no large-scale, expensive A/D converter that corresponds to high-speed clocks need be used. That is, the charge signals transferred in the circulating shift register can be read out as output voltages from the floating gate electrode 102, and can be A/D-converted using an inexpensive A/D converter.

After the frequency of the transfer clocks $CK_1$ and $CK_2$ is lowered, since new charge signals are prevented from being transferred to the linear CCD 17 by inhibiting application of the pulses SH, detection errors can be prevented even when, for example, external light changes unexpectedly.

[SECOND EMBODIMENT]

Figure 8:
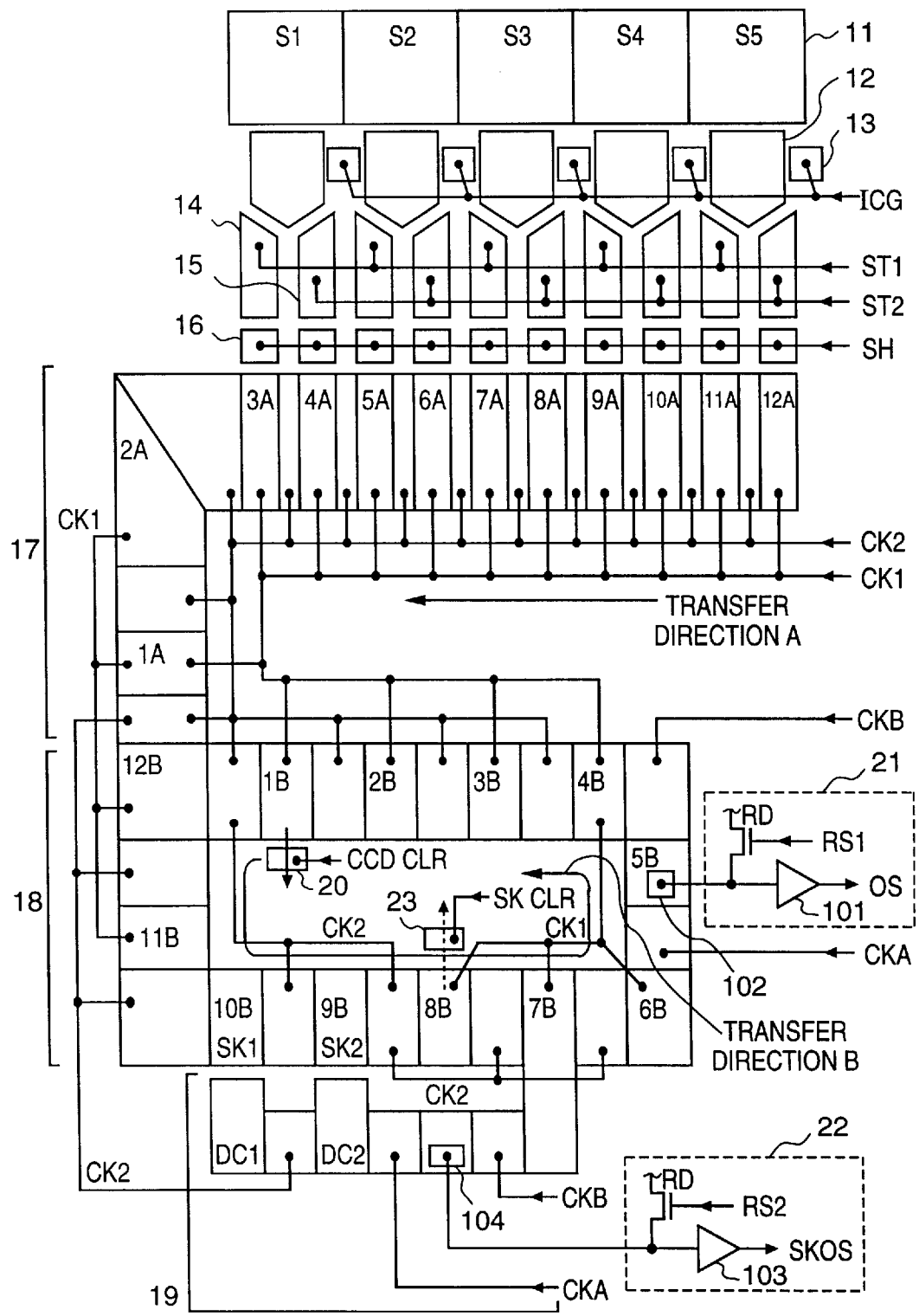
FIG. 8 is a schematic diagram showing the arrangement of a circulating shift register according to the second embodiment of the present invention.

FIG. 8 shows the arrangement of a circulating shift register according to the second embodiment of the present invention.

In the second embodiment, a function called a "skim operation" is added to the circulating shift register of the first embodiment shown in FIG. 1. Hence, the same reference numerals in the arrangement shown in FIG. 8 denote the same parts as in FIG. 1, a detailed description thereof will be omitted, and only the differences from the first embodiment will be explained below. In addition, the clock generation circuit 100, the pulse generation circuit 110, and the mode control circuit 120 shown in FIG. 1 are not shown in FIG. 8.

As shown in FIG. 8, the charge transfer channels $10_B$ and $9_B$ of the ring CCD 18 are configured as charge transfer channels $SK_1$ and $SK_2$ for supplying overflowing charge signals to a skim portion 19, and are respectively formed with predetermined capacity to leave only a predetermined amount of charges or less. When a charge signal, the amount of which has exceeded the predetermined amount of the charge transfer channel $SK_1$, is transferred from the charge transfer channel $11_B$, the overflowing charges flow into a charge transfer channel $DC_1$ of the skim portion 19 juxtaposed with the charge transfer channel $SK_1$. In this manner, after the charge signal transferred from the charge transfer channel $11_B$ is distributed to the charge transfer channels $SK_1$ and $DC_1$, the charge signals in these channels are respectively transferred to the charge transfer channels $SK_2$ and $DC_2$ in response to a pulse $CK_2$. The charge transfer channel $SK_2$ is formed with predetermined capacity to leave a predetermined amount of charges smaller than that of the charge transfer channel $SK_1$, and overflowing charges from the channel $SK_2$ flow into the charge transfer channel $DC_2$ to be added to the charge signal transferred from the charge transfer channel $DC_1$.

In the second embodiment, an SK output portion 22 comprising an output amplifier 103 has the same arrangement as that of the output portion 21 connected to the floating gate electrode 102 formed on the charge transfer channel $5_B$ of the ring CCD 18. When a reset signal $RS_2$ is applied to the transfer gate of the SK output portion 22, the SK output portion 22 resets a floating gate electrode 104 of the skim portion 19 to RD level. When the charge signal is transferred from the charge transfer channel $DC_2$ to a charge transfer channel having the floating gate electrode 104, an output signal SKOS appears in correspondence with the charge amount of the transferred signal.

Figure 9:
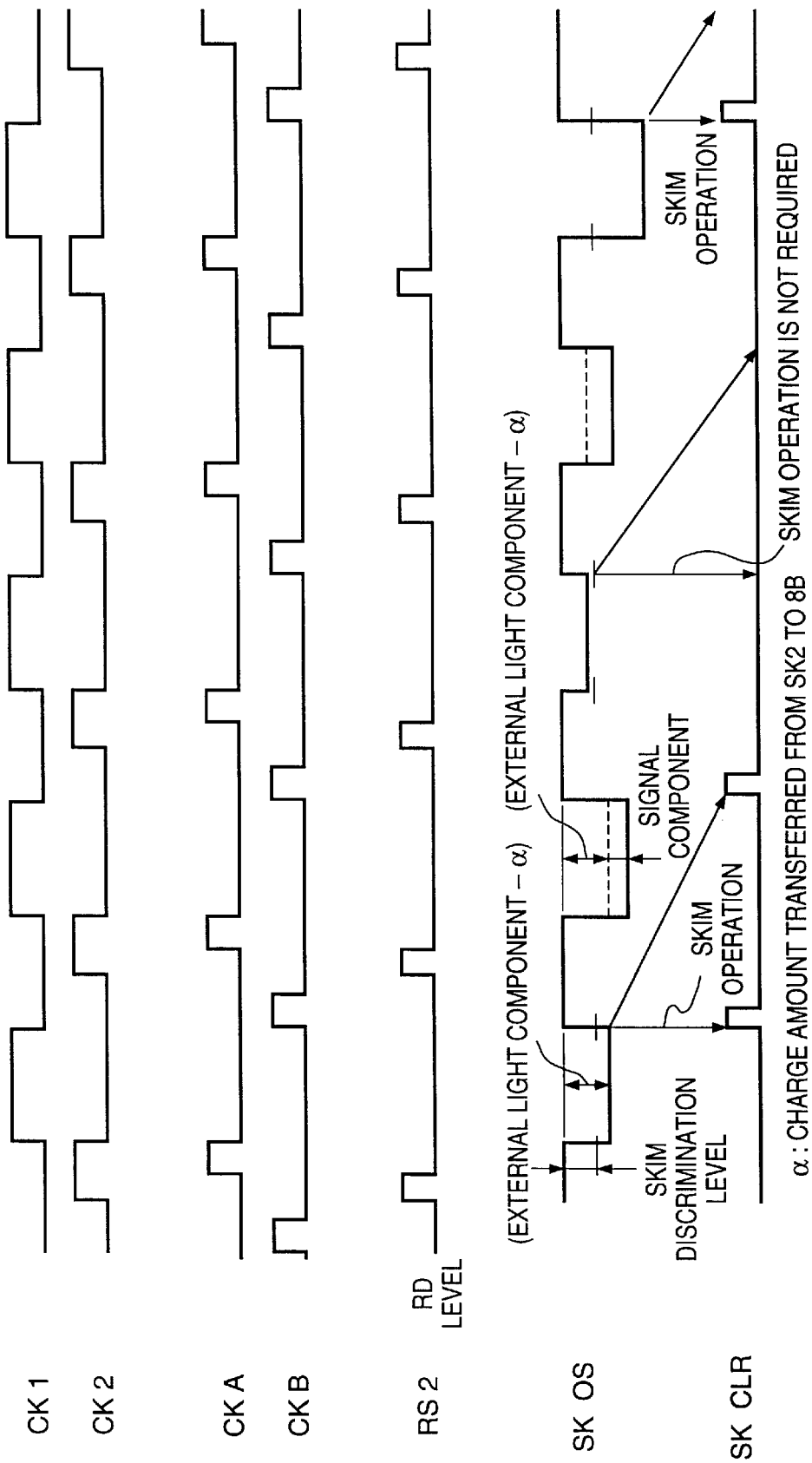
FIG. 9 is a timing chart showing the operation timing of a skim portion of the circulating shift register according to the second embodiment of the present invention.

As shown in FIG. 9, at the transfer timing of a charge signal corresponding to external light components during the OFF period of the IRED, the output signal SKOS is compared with a predetermined skim discrimination level by a comparator (not shown). Upon detecting the output signal SKOS that exceeds the skim discrimination level, it is determined that "many charges are present and may saturate the charge transfer channels", and the pulse generation circuit 110 (see FIG. 1) outputs pulses SKCLR at the timings shown in FIG. 9 with respect to the charge signal of interest and the next charge signal to be transferred.

Upon application of the pulses SKCLR, a skim clear portion 23 flows all the charges (the amount of which is α) present in the charge transfer channel $8_B$ to a ground line (not shown) to clear the charge transfer channel $8_B$. On the other hand, when no pulses SKCLR are output, charges in the charge transfer channel $8_B$ are directly transferred to the charge transfer channel $7_B$, and are added to charges transferred from the charge transfer channel comprising the floating gate electrode 104 of the skim portion 109. More specifically, only when the comparator (not shown) detects external light components beyond the reference level, equal charge amounts α are respectively skimmed from a pair of transferred charge signals obtained by the identical sensor during the ON and OFF periods of the IRED.

Since the pair of transferred charge signals that have been subjected to the skim operation undergo the following calculation in the output mode:

(signal components + (external light components −
α) irradiated onto $S_1$) − (external light
components irradiated onto $S_1$ − α)

the obtained result is (signal components irradiated onto $S_1$), i.e., the same result as that obtained when no skim operation is performed is obtained.

Therefore, the above-mentioned circulating shift register with the skim function can repetitively execute skim operations under the condition of strong external light. With this operation, each charge transfer channel can be prevented from being saturated due to charges corresponding to extcompo light components, and charges corresponding to signal components reflected by the object can be stored up to an amount large enough to perform distance measurement calculation.

The operations in the respective modes of the circulating shift register according to the second embodiment will be briefly described below. As in the first embodiment, all the charges in the circulating shift register are cleared in the initialization mode. In the accumulation mode, charges are repetitively accumulated and added in response to transfer clocks $CK_1$ and $CK_2$ of 250 kHz. When an output signal OS from the output portion 21 has exceeded the reference voltage of the comparator 205 (see FIG. 2), the control enters the output mode.

In the output mode, as in the first embodiment, the mode control circuit 120 (see FIG. 1) controls the pulse generation circuit 110 (see FIG. 1) to stop application of pulses SH, thereby preventing new charges from being transferred to the linear CCD 17. At the same time, the mode control circuit 120 controls the clock generation circuit 100 (see FIG. 1) to lower the frequency of the transfer clocks $CK_1$ and $CK_2$ to 15 kHz.

However, in this embodiment, the A/D converter 204 (see FIG. 2) for output does not immediately operate at that time, but the reading operation by the control circuit is started after charges are transferred at least a round of the ring CCD 18. With this operation, all the residual charge signals in the linear CCD 17 can be transferred to the ring CCD 18, and can be output after the skim operation. Therefore, detection with higher sensitivity can be attained.

After the reading operation is started, the mode control circuit 120 controls the pulse generation circuit 110 to inhibit generation of pulses SKCLR. This is to prevent a skim operation from taking effect inadvertently upon an increase in charge in the charge transfer channels in the ring CCD 18 due to a dark current during the reading operation of the signal OS from the output portion 21. Since the skim operation may often generate noise called skim noise due to nonuniform charge amounts to be skimmed, the operation is preferably stopped when it is not required.

According to the first or second embodiment, since the reading operation from the circulating shift register can be attained by a relatively inexpensive, simple A/D converter, and the circulating shift register and its reading circuit can be integrated on a one-chip integration circuit, a cost reduction can be attained.

[THIRD EMBODIMENT]

A distance measuring device will be described below as the third embodiment of the present invention. The distance measuring device of this embodiment obtains an image formed on the CCD shown in FIG. 1 or 8 by controlling the CCD in the procedure shown in FIGS. 4 to 7B. Then, the device measures the distance to the object using the obtained image.

Figure 10:
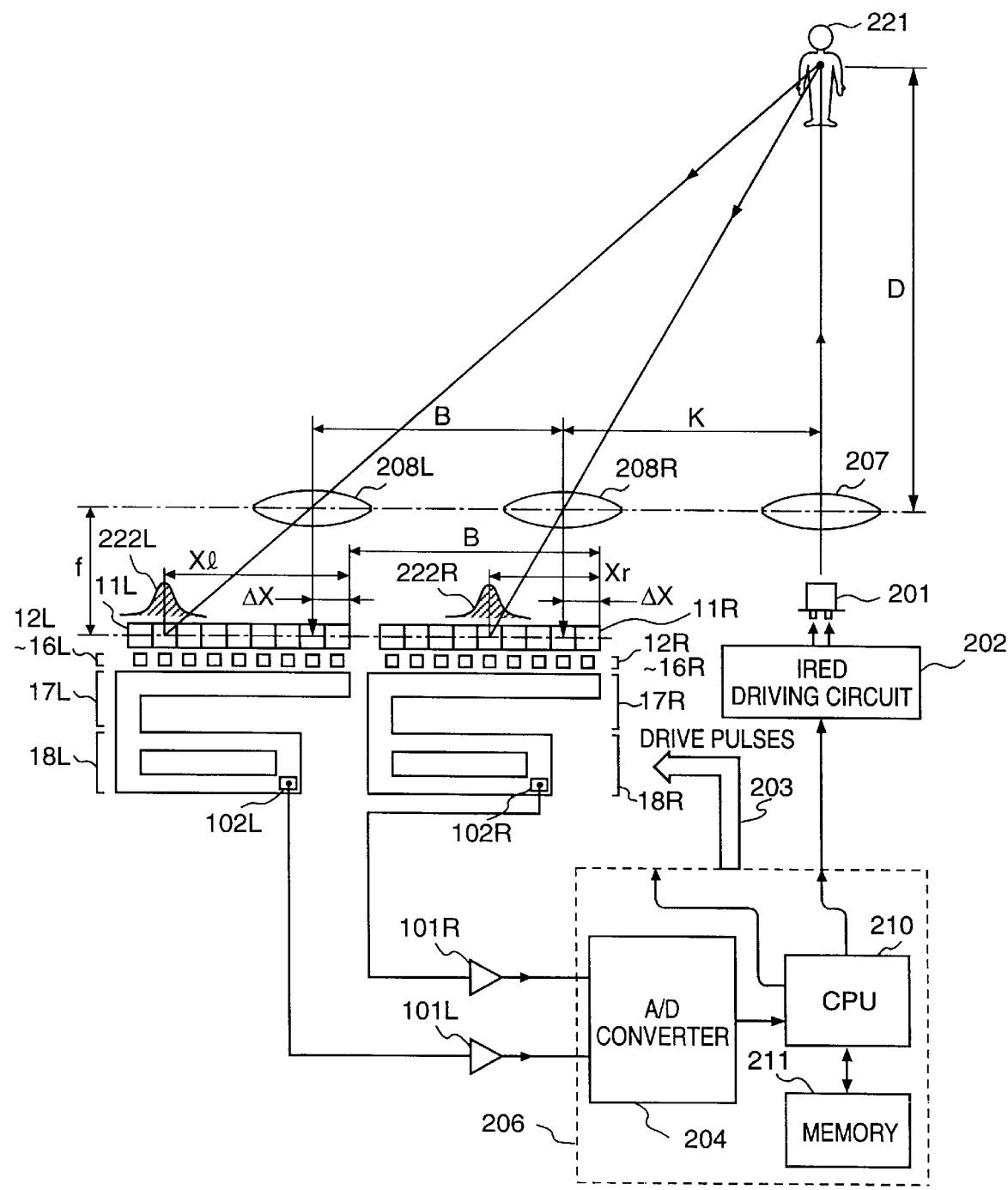
FIG. 10 is a diagram showing an example in which a distance measuring device according to the first embodiment of the present invention is applied to an AF unit of a camera.

In an example of the device shown in FIG. 10, a distance measuring device which comprises the ring CCD (circulating shift register) 18 described above with reference to FIG. 1 is applied to an auto-focusing unit of a camera. The auto-focusing unit must have a very broad dynamic range (normally, about 1:1000) since it is normally required to cope with a broad object range from an object at near distance and having high reflectance to an object at far distance and having low reflectance. Hence, since it is generally difficult to assure a sufficiently broad dynamic range in a signal processing circuit of the auto-focusing unit, various means for broadening the dynamic range have been proposed. In the example to be described below, a signal level high enough to perform distance measurement calculations is obtained by the accumulation operation using the ring CCD. If a signal converted by the sensor array has a sufficient level, the accumulation is performed by several circulation of the signal, and if the signal has an insufficient level, the accumulation is performed by several hundred circulation. Since the distance measuring device shown in FIG. 10 comprises two devices equivalent to that shown in FIG. 1, "R" or "L" is appended to the same reference numerals that denote the same parts as in FIG. 1.

Referring to FIG. 10, light beam pulses emitted by an IRED 201 that emits near-infrared rays are focused by a projection lens 207, and are irradiated onto an object 221. Some light components of the near-infrared rays reflected by the object 221 are focused by a light-receiving lens 208R and form a received-light image 222R on a sensor array 11R. On the other hand, the near-infrared rays focused via a light-receiving lens 208L form a received-light image 222L on a sensor array 11L.

An IRED driving circuit 202 drives to flicker the IRED 201 at predetermined cycles. Signal charge integral portions (signal charge supply means) 12R to 16R and 12L to 16L integrate signal charges from the corresponding sensor arrays 11R and 11L, and supply accumulated charges to linear CCDs (signal charge injection means) 17R and 17L at predetermined timings.

The signal charges supplied to the linear CCD 17R are injected into a circulating shift register 18R in accordance with a transfer clock as one of drive pulses 203 generated by an AF processing circuit 206. Likewise, the signal charges supplied to the linear CCD 17L are injected into a circulating shift register 18L. The signal charges that go around the circulating shift registers 18R and 18L are read out via floating electrode portions 102R and 102L and are transferred to the AF processing circuit 206 via output amplifiers 101R and 101L. The AF processing circuit 206 calculates a distance D to the object 221 on the basis of a position Xr of the received-light image 222R on the sensor array 11R and a position Xl of the received-light image 222L on the sensor array 11L.

The AF processing circuit 206 comprises an A/D converter 204, a CPU 210, and a memory 211, and generates the drive pulses 203 for driving the sensor arrays 11R and 11L, the signal integral portions 12R to 16R and 12L to 16L, and the circulating shift registers 18R and 18L so as to control their operations.

Referring to FIG. 10, the projection lens 207 and the light-receiving lenses 208R and 208L are present on an identical line, the distance between the light-receiving lenses 208R and 208L is B, the distance between the light-receiving lens 208R and the projection lens 207 is K, and the object 221 is separated from the projection lens 207 by a distance D in a direction along the optical axis of the lens 207. Also, the distance between the sensor arrays 11R and 11L is B, and the sensor arrays 11R and 11L are respectively separated from the light-receiving lenses 208R and 208L by a focal length f common to these lenses. Furthermore, let Xl be the distance from one end of the sensor array 11R to the received-light image 222R, $\Delta X$ be the distance from one end of the sensor array 11R to the vertically projected point of the principal point of the light-receiving lens 208R onto the sensor array 11R, Xl be the distance from one end of the sensor array 11L to the received-light image 222L, and $\Delta X$ be the distance from one end of the sensor array 11L to the vertically projected point of the principal point of the light-receiving lens 208L onto the sensor array 11L.

Concerning each of the light-receiving lenses 208R and 208L, since two triangles, which include the principal points of the light-receiving lens as common vertices, are similar to each other, the following equations hold:

$$D/K = f/(Xr - \Delta X) \quad (1)$$

$$D/(B+K) = f/(Xl - \Delta X) \quad (2)$$

By eliminating K from these equations (1) and (2), and solving them for D, we have:

$$D = B f/(Xl - Xr) \quad (3)$$

More specifically, since B and f are constant and are known values, the distance D to the object 221 can be calculated by trigonometric measurements by detecting the positions Xr and Xl of the received-light images 222R and 222L on the sensor arrays 11R and 11L.

FIG. 3 is an enlarged view of the structure from the sensor array 11 to the linear CCD 17 in the device shown in FIG. 1. The flow of charge in the distance measuring device of this embodiment will be explained below with reference to FIG. 10 and FIG. 3.

In FIG. 10, the AF processing circuit 206 drives to flicker the IRED 201 via the IRED driving circuit 202. Therefore, the received-light images 222R and 222L formed based on light rays from the IRED 201 also flicker. More specifically, the received-light images 222R and 222L appear on the sensor arrays 11R and 11L during the ON period of the IRED 201 and these received-light image signals and external light are converted by photosensors (photoelectric conversion elements) $S_1$ to $S_5$ of the sensor arrays 11R and 11L into charge signals. During the OFF period of the IRED 201, only external light is irradiated onto the photosensors $S_1$ to $S_5$ of the sensor arrays 11R and 11L, and only the external light components are converted into charge signals.

In FIG. 3, a signal charge photoelectrically converted by one sensor $S_2$ of the sensor array 11 is integrated by a corresponding integral portion 12 via a route 301. When a pulse ICG is applied to a line ICG connected to a clear portion 13 at the timing shown in FIG. 5, the signal charge present in the integral portion 12 flows onto a ground line (not shown) via a route 302. More specifically, the charge in the integral portion 12 is cleared. In this way, by controlling the pulse ICG, a so-called electronic shutter function of arbitrarily controlling the charge accumulation time of the integral portion 12 can be obtained.

Time periods $t_1$ and $t_2$ between the pulses ICG, and $ST_1$ and $ST_2$ shown in FIG. 5 correspond to the integral time. Each integral portion 12 comprises first and second accumulation portions 14 and 15 at neighboring positions. A charge flows from the integral portion 12 into the first accumulation portion 14 via a route 304 in response to the pulse $ST_1$ at the timing shown in FIG. 5. On the other hand, a charge flows from the integral portion 12 to the second accumulation portion 15 via a route 303 in response to the pulse $ST_2$ at the timing shown in FIG. 5. The first and second accumulation portions 14 and 15 are alternately juxtaposed, and shift portions 16 are arranged beneath them.

When a pulse SH is applied to each shift portion 16, the charge accumulated in each first accumulation portion 14 is transferred to the charge transfer channel of the linear CCD 17 via a route 306. On the other hand, the charge accumulated in each second accumulation portion 15 is transferred to the charge transfer channel of the linear CCD 17 via a route 305.

As shown in FIG. 5, since the pulses $ST_1$ are controlled by the AF processing circuit 206 to be output in synchronism with the OFF state (immediately before the ON operation) of the IRED 201, each first accumulation portion 14 accumulates a charge corresponding to external light irradiated onto the sensor array 11. On the other hand, since the pulses $ST_2$ are controlled by the AF processing circuit 206 to be output in synchronism with the ON state (immediately before the OFF operation) of the IRED 201, each second accumulation portion 15 accumulates a charge corresponding to the sum of signal components reflected by the object and external light components, which are irradiated onto the sensor array 11. The charges accumulated in the first and second accumulation portions 14 and 15 are respectively transferred to the charge transfer channels $3_A$ to $12_A$ in FIG. 1 in response to pulses SH. Hence, charges corresponding to only external light components are transferred to the odd-numbered charge transfer channels $3_A$, $5_A$, $7_A$, $9_A$, and $11_A$, and charges corresponding to the sums of signal components reflected by the object and external light components are transferred to the even-numbered charge transfer channels $4_A$, $6_A$, $8_A$, $10_A$, and $12_A$.

Note that the charge transfer channels $1_A$ and $2_A$ are those which are added in association with the arrangements of the linear CCD 17 and the circulating shift register 18, and serve as non-signal portions to which no signal charges from the sensor array 11 are directly transferred from the shift portions 16.

The circulating shift register 18 transfers charge signals in the transfer direction B in FIG. 1 in response to clock pulses $CK_1$ and $CK_2$. As shown in FIG. 5, since the pulses SH are synchronized with the cycle of one round of the circulating shift register 18, and the ON/OFF cycle of the IRED 201 and the pulses $ST_1$ and $ST_2$ are synchronized with the pulses SH, the charge transfer channels $1_B$ to $12_B$ of the circulating shift register 18 always add signal charges obtained by integrating charges from the identical pixels $S_1$ to $S_5$.

In the distance measuring device shown in FIG. 10, in the initialization mode shown in FIG. 4, pulses $ST_1$, $ST_2$, ICG, $CK_1$, and $CK_2$ are output under the condition that the time periods $t_1$ and $t_2$ described above with reference to FIG. 5 are set to be:

$$t_1 = t_2 = 0$$

Since $t_1=t_2=0$, charges in the integral portions 12 are cleared. By applying pulses CCDCLR during the period required for charges to go around the circulating shift register 18 three or more times, all the residual charges in the first and second accumulation portions 14 and 15, the linear CCD 17, and the circulating shift register 18 are removed via a CCD clear portion 20 shown in FIG. 1. After all the charges in the respective portions are perfectly cleared, the pulses CCD-CLR are stopped, as shown in FIG. 4, and the control enters the accumulation mode.

In the accumulation mode, generation of the pulses ICG, $ST_1$, $ST_2$, SH, $CK_1$, and $CK_2$ and the operation of the IRED 201 are controlled at predetermined timings shown in FIG. 5 under the following condition:

$$t_1 = t_2 > 0$$

At this time, as described above, charges corresponding to external light during the OFF period of the IRED 201 are transferred to the charge transfer channels $3_A$, $5_A$, $7_A$, $9_A$, and $11_A$ of the linear CCD 17 via the first accumulation portions 14, and are sequentially added and stored in the circulating shift register 18. Likewise, charges corresponding to the sums of signal components reflected by the object and external light components during the ON period of the IRED 201 are transferred to the charge transfer channels $4_A$, $6_A$, $8_A$, $10_A$, and $12_A$ via the second accumulation portions 15, and are sequentially added and stored in the circulating shift register 18.

Note that the cycle required for charges accumulated on the ring CCD 18 to go around it is synchronized with those of the IRED and the signal SH. For this reason, the CPU 210 can count the number of rounds. The CPU 210 stores the count value in the memory 211 as a variable LOOP.

A signal OS as the output signal from the output portion 21 is supplied to the AF processing circuit 206 via a corresponding one of the amplifiers 101R and 101L. When the signal OS has reached a level high enough to perform distance measurement calculations, the control enters the output mode shown in FIG. 4, and generation of the pulses SH is stopped to stop addition of signal charges. On the other hand, the signal OS is output at the timing shown in FIG. 6. In this case, in order to facilitate the input operation of the signal OS after A/D conversion, the frequency of transfer clock pulses $CK_1$ and $CK_2$ is lowered. FIG. 4 shows the state wherein the frequency of the transfer clock pulses $CK_1$ and $CK_2$ are changed from 240 kHz to 15 kHz.

The level of the signal OS A/D-converted by the A/D converter 204 of the AF processing circuit 206 is written in the memory 211 via the CPU 210. Data written in the memory 211 are arranged as follows in the output order of signals OS of the distance measuring operation.

level in non-signal state
level in non-signal state
external light components irradiated onto pixel $S_1$
external light components+signal components irradiated onto pixel $S_2$
external light components irradiated onto pixel $S_2$
external light components+signal components irradiated onto pixel $S_2$
. . .
external light components irradiated onto pixel $S_5$
external light components+signal components irradiated onto pixel $S_5$ Hence, the following calculations can extract only data corresponding to signal components on the photosensors $S_1$ to $S_5$ based on the data in the memory 211:

(level of non-signal portion) − (level of non-signal portion) = 0
(signal components + external light components irradiated onto pixel $S_1$) − (external light components irradiated onto pixel $S_1$) = signal components irradiated onto pixel $S_1$
(signal components + external light components irradiated onto pixel $S_2$) − (external light components irradiated onto pixel $S_2$) = signal components irradiated onto pixel $S_2$
. . .
(signal components + external light components irradiated onto pixel $S_5$) − (external light components irradiated onto pixel $S_5$) = signal components irradiated onto pixel $S_5$        (1)

The positions Xr and Xl of the received-light images 222R and 222L can be obtained from the execution results of the above-mentioned processing for output from the two circulating shift registers 18R and 18L. Also, substitution of these positions Xr and Xl into equation ③ yields the distance D to the object 221.

FIG. 11 shows the arrangement of the sensor array 11, the integral portions 12, the clear portions 13, the first and second accumulation portions 14 and 15, and the shift portions 16 (these portions 12 to 16 will be generally referred to as "signal integral portions" hereinafter), the linear CCD 17, the circulating shift register 18, and the like of the distance measuring device shown in FIG. 10. On the other hand, assume that the sensor array 11 in FIG. 11 is constituted by 10 photosensors $S_1$ to $S_{10}$. Also, light rays emitted by the IRED 201 and reflected by the object and external light are irradiated onto the sensor array 11, and form the received-light image 222.

Figure 12A:
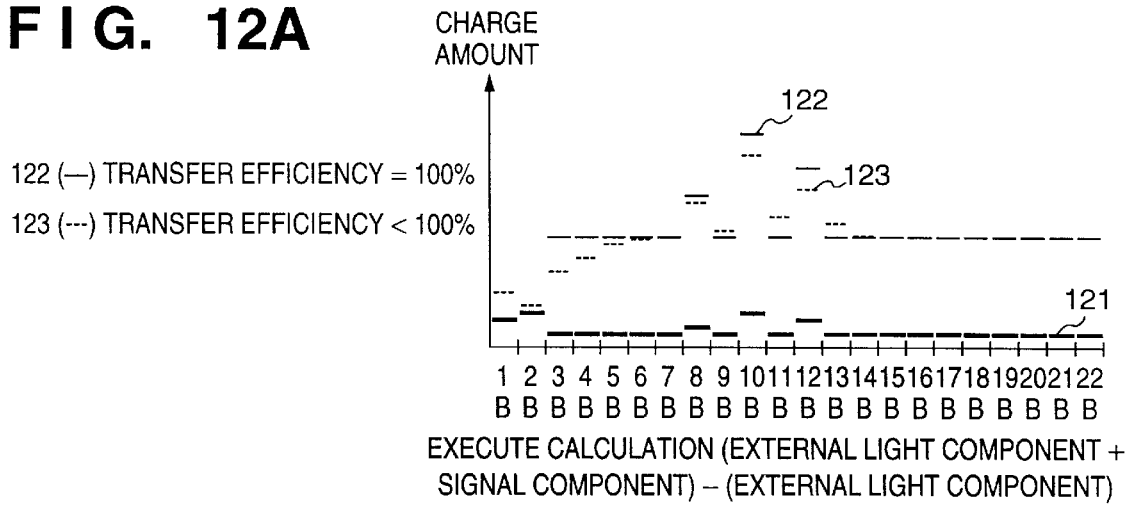
FIGS. 12A to 12D are views for explaining the operation of the distance measuring device according to the first embodiment of the present invention.

FIGS. 12A to 12D show the distributions of the charge amounts in charge transfer channels $1_B$ to $22_B$ and the signal levels of the photosensors $S_1$ to $S_{10}$ upon executing the accumulation operation in this state. In FIG. 12A, bold lines 121 corresponding to the charge transfer channels $1_B$ to $22_B$ define the charge amount distribution obtained by one accumulation (i.e., one ON operation of the IRED 201) in the circulating shift register 18. On the other hand, fine lines 122 define the charge amount distribution obtained after the accumulation in the circulating shift register 18 is repeated 10 times, i.e., an ideal distribution obtained when the transfer efficiency of the charge transfer channels $1_B$ to $22_B$ is 100%. Also, broken lines 123 define the charge amount distribution obtained when the transfer efficiency is about 99.5%.

Figure 12B:
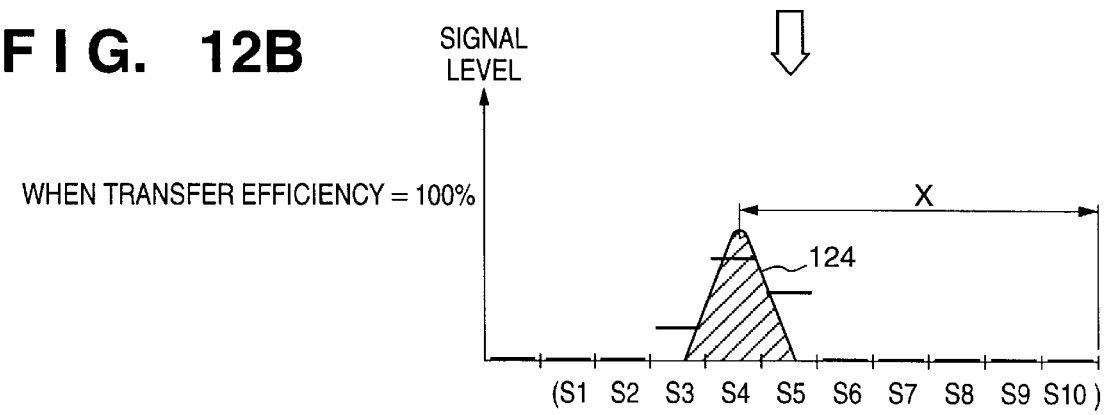

By executing the above-mentioned calculations (external light components+signal components)−(external light components) (formulas (1)) based on the charge amount distribution 122, the power distribution of infrared rays emitted by the IRED 201 and irradiated onto the sensor array 11 at an ideal transfer efficiency is obtained. A received-light image 124 of the infrared rays is reconstructed based on this power distribution, as shown in FIG. 12B, and an ideal position X (e.g., a peak position or barycentric position) of the received-light image 124 can be obtained based on the reconstructed image. Horizontal line segments in FIG. 12B indicate the calculation results of formulas (1).

Figure 12C:
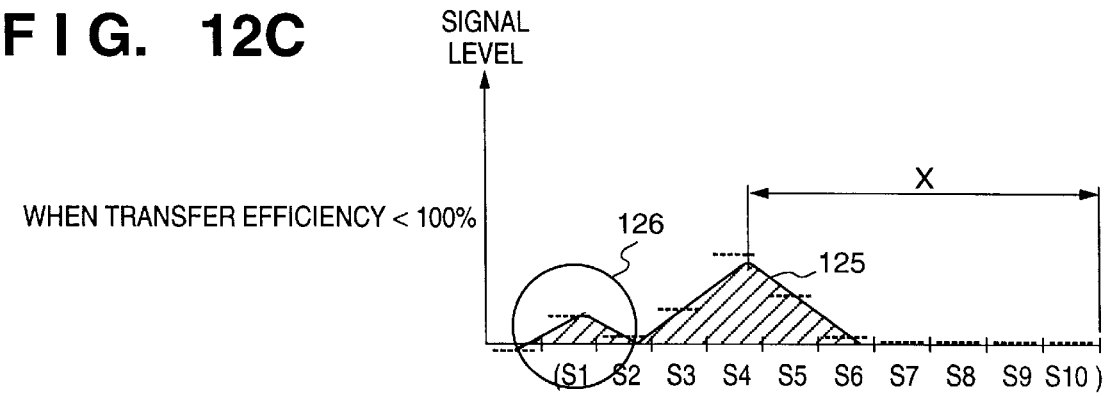

Likewise, by executing the calculations (external light components+signal components)–(external light components) based on the charge amount distribution 123, the power distribution of infrared rays irradiated onto the sensor array 11 can be obtained. From this power distribution, a received-light image 125, which is formed by infrared rays emitted by the IRED 201 and reflected by the object, is reconstructed, as shown in FIG. 12C, and the position X of the received-light image 125 can be obtained based on the reconstructed image. In this case, since the transfer efficiency of the charge transfer channels $1_B$ to $22_B$ is less than 100%, a false received-light image 126 appears at a neighboring position of the received-light image 125. The false received-light image 126 is a noise in the distance measurement calculations. Broken line segments in FIG. 12C indicate the calculation results of formulas (1).

Figure 12D:
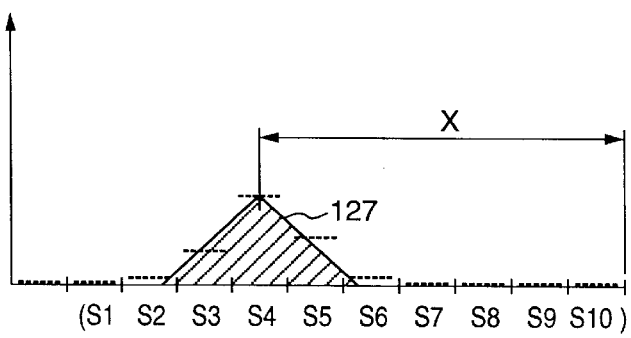

In view of this problem, the charge amounts in the charge transfer channels $3_B$ and $4_B$ (corresponding to the photosensors $S_1$ and $S_2$) adjacent to non-signal portions $1_B$ and $2_B$ (corresponding to those formed in the charge transfer channels $1_A$ and $2_A$ during the first ON period of the IRED 201; the same applies to the following description) of the charge transfer channels $1_B$ to $22_B$ are ignored and are set to be "0". Thereafter, by executing the calculations (external light components+signal components)–(external light components), the power distribution of infrared rays emitted by the IRED 201 and irradiated onto the sensor array 11 can be calculated more accurately. From this power distribution, a received-light image 127 of infrared rays emitted by the IRED 201, which image is free from any noise, can be reconstructed from the power distribution, as shown in FIG. 12D, even when the transfer efficiency of the charge transfer channels $1_B$ to $22_B$ and $1_A$ to $22_A$ is less than 100%. More specifically, the false received-light image 126 that appears in FIG. 12C disappears, and noise components in the distance measurement calculations can be reduced, thus allowing accurate distance measurements. Also, signal charges appearing in the non-signal portions $1_B$ and $2_B$ are ignored as noise upon executing the distance measurement calculations.

Figure 13A:
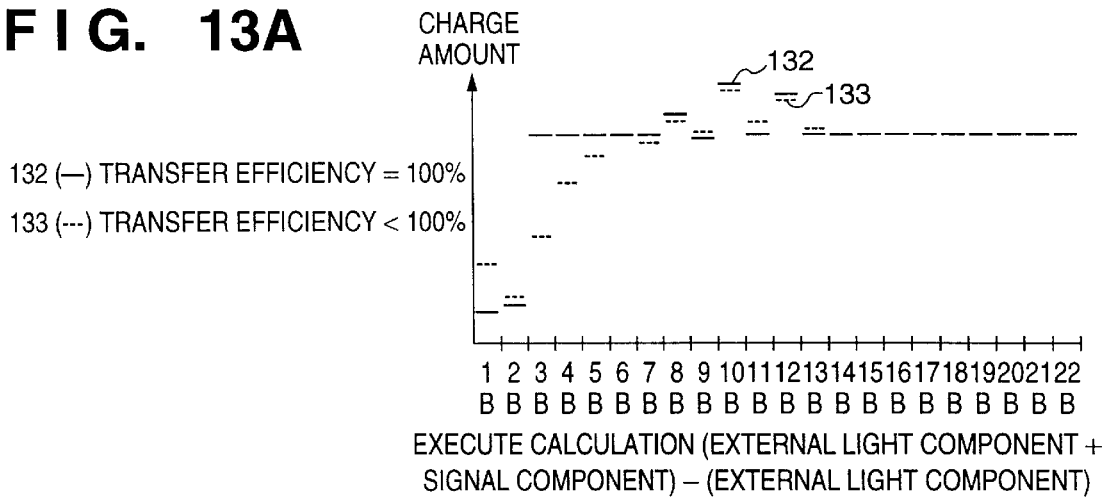
FIGS. 13A to 13D are views for explaining the operation of the distance measuring device according to the first embodiment of the present invention.

FIGS. 13A to 13D show the distributions of the charge amounts in the channels $1_B$ to $22_B$ and the signal levels of the pixels $S_1$ to $S_{16}$ obtained when the power of infrared rays irradiated on the sensor array 11 is lower than that in the case of FIGS. 12A to 12D, and accumulation is repeated 20 times. In FIG. 13A, solid lines 132 define the charge amount distribution obtained after the accumulation in the circulating shift register 18 is repeated 20 times, i.e., an ideal distribution obtained when the transfer efficiency is 100%. Also, broken lines 133 define the charge amount distribution obtained when the transfer efficiency is about 99.5%.

Figure 13B:
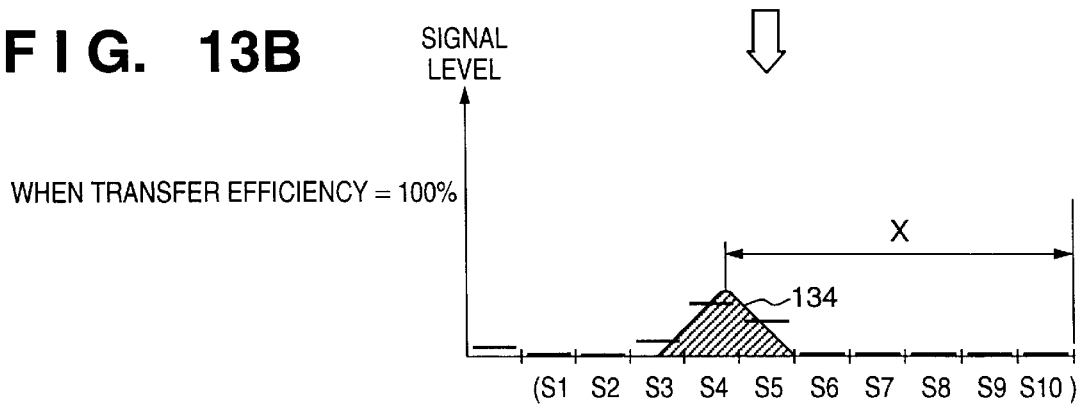

By executing the calculations (external light components+signal components)–(external light components) based on the charge amount distribution 132, the power distribution of infrared rays irradiated onto the sensor array 11 is obtained. From this power distribution, a received-light image 134 of the object formed by the infrared rays emitted by the IRED 201 is reconstructed, as shown in FIG. 13B, and an ideal position X (e.g., a peak position or barycentric position) of the received-light image 134 can be obtained from the reconstructed image.

Figure 13C:
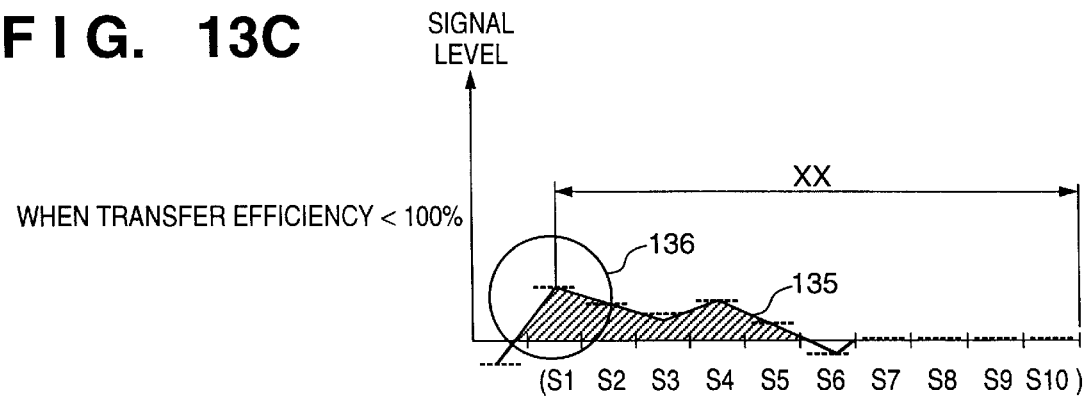

Likewise, by executing the calculations (external light components+signal components)–(external light components) based on the charge amount distribution 133, the power distribution of infrared rays irradiated onto the sensor array 11 is obtained. From this power distribution, a received-light image 135 of infrared rays is reconstructed, as shown in FIG. 13C. In this case, a false received-light image 136 generated due to a transfer efficiency less than 100% of the charge transfer channels $1_B$ to $22_B$ has a larger signal level than that of the true received-light image 135, and a peak position XX of the false received-light image 136 is used as that of the received-light image, for example, when the peak position of the signal level is obtained as the position of the received-light image.

Figure 13D:
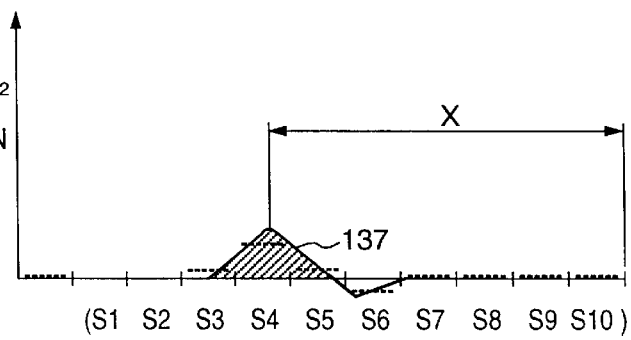

In view of this problem, when the number of times of accumulation of the signals is large, the charge amounts in the charge transfer channels $3_B$ and $4_B$ adjacent to the non-signal portions $1_B$ and $2_B$ of the charge transfer channels $1_B$ to $22_B$, and in the charge transfer channels $5_B$ and $6_B$ adjacent to the channels $3_B$ and $4_B$ are ignored, and their signal levels are set to be "0". Thereafter, the calculations (external light components+signal components)–(external light components) are executed to obtain the power distribution of infrared rays irradiated onto the sensor array 11. From this power distribution, a received-light image 137 of the infrared rays emitted by the IRED 201, which image is free from any noise, is reconstructed, as shown in FIG. 13D. More specifically, even when the transfer efficiency of the charge transfer channels $1_B$ to $22_B$ is less than 100%, the false received-light image 136 disappears, and a correct position X can be calculated.

Figure 14:
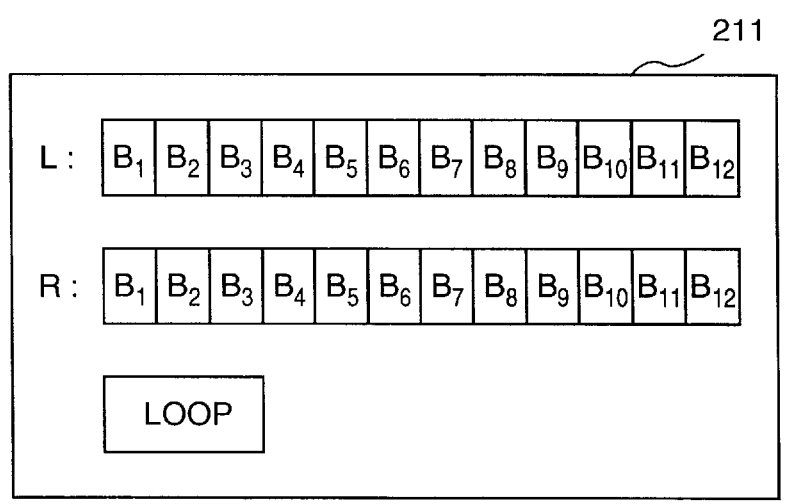
FIG. 14 is a view showing the signal values stored in a memory and the number of times of circulation in a CCD.
Figure 15A:
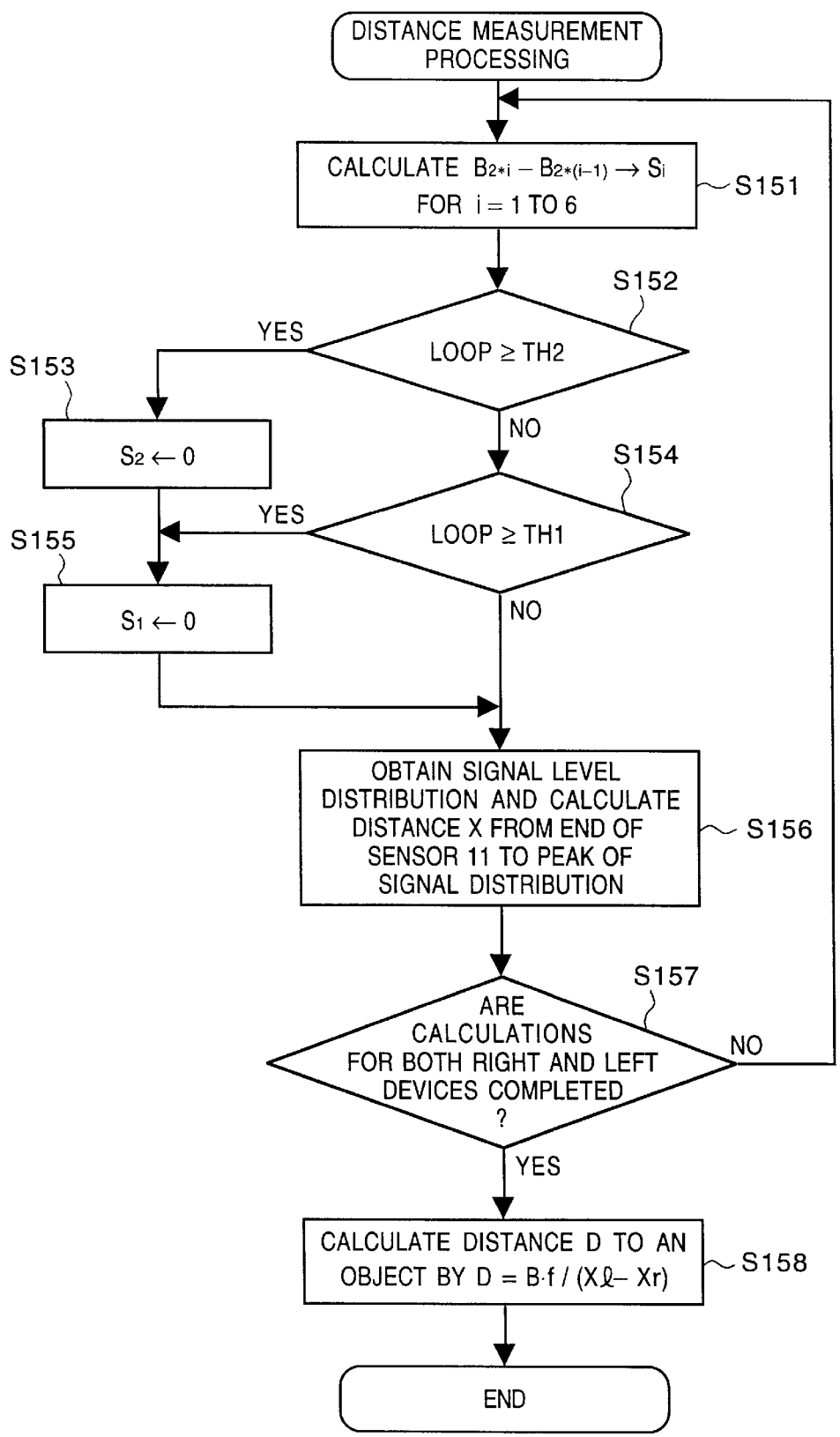
FIGS. 15A and 15B are flow charts of the procedure for calculating distance.

FIG. 14 shows the state wherein digital values corresponding to the charge amounts accumulated on the channels $1_B$ to $12_B$ of the ring CCDs are stored in the memory 211. FIG. 15A shows the processing procedure of the above-mentioned distance measurement processing by the CPU 210.

Signal values $B_1$ to $B_{12}$, which are read out after they go around the ring CCDs and are stored in the memory 211 as digital values, respectively correspond to the values of non-signal level, non-signal level, external light components on the sensor $S_1$, signal components+external light components on the sensor $S_1$, ..., external light components on the sensor $S_5$, and signal components+external light components on the sensor $S_5$. The calculations (signal components+external light components)–(external light components) are made in correspondence with the respective sensors to obtain only signal components $S_i$ (i–1 to 5) (step S151).

It is then checked if the number LOOP of rounds of charges that go around the ring CCD for one distance measurement is larger than a predetermined threshold value TH2 (step S152). If YES in step S152, signal values $S_1$ and $S_2$ are set to be "0"(steps S153 and S155). The signal value $S_1$ is obtained based on charges in the channels $3_B$ and $4_B$ adjacent to the non-signal portions $1_B$ and $2_B$, and the signal value $S_2$ is obtained based on charges in the cells $5_B$ and 6B adjacent to the channels $3_B$ and $4_B$.

On the other hand, if LOOP is equal to or smaller than the threshold value TH2 and is larger than a threshold value TH1, only the signal value $S_1$ is set to be "0"(step S155). On the other hand, if LOOP is equal to or smaller than the threshold value TH1, the measured signal values $S_1$ to $S_5$ are left unchanged.

Based on the distribution of the obtained signal values $S_1$ to $S_5$, the peak of the signal distribution is calculated, as shown in FIG. 12D or 13D, and the distance X from the end of the sensor to the peak position is calculated (S156).

The above-mentioned processing is performed for the signal values obtained from both the right and left ring CCDs, and the distances Xr and Xl from the sensor array ends to the peak positions are calculated in correspondence with the right and left sensors (step S157). Finally, the distance D to the object is calculated by equation D=B f/(Xl−Xr) (step S158). Note that B is the distance between the right and left lenses, and f is the focal length of these lenses. In this way, the CPU 210 measures the distance.

Since the threshold value $TH_1$ is the one for canceling the peak of false signal level, $TH_1$=1 may be set to always set the signal value $S_1$ to be "0". On the other hand, since the threshold value TH2 is the one for preventing the false peak from becoming larger than the true peak, the value TH2 is determined based on the transfer efficiency of the CCD. More specifically, the number of rounds of charges at which the false peak formed by the values $S_1$ and $S_2$ becomes larger than the peak representing the object is set to as TH2. This amounts to ignoring light components detected by the sensor $S_1$ or $S_2$ of the sensor array 11 in accordance with the values TH1 and TH2.

As described above, according to this embodiment, in the distance measuring device using the circulating shift register 18 which converts external light irradiated onto the sensor array 11 and a signal reflected by the object into charge signals, and gradually accumulates the signals by circulating them, signal charges in the channels adjacent to the non-signal portions $1_B$ and $2_B$ (adjacent in a direction opposite to the circulating direction of charges when viewed from the non-signal portions) of the charge transfer channels $1_B$ to $22_B$ of the circulating shift register 18 are ignored (i.e., accumulated charge=0) upon executing distance measurement calculations. With this control, even when the charge transfer efficiency is less than 100%, a false received-light image can be prevented from being generated, and the accurate position of a received-light image can be obtained. By performing a calculation based on the position of the image, the distance to the object can be obtained accurately. Even when the distance measurement calculations are performed while ignoring predetermined signal charges, pixels corresponding to the signal charges to be ignored are only a few of those on which an actual received-light image is formed, and such signal charges have no influence on the distance measurements. In this embodiment, since the pairs of first and second accumulation portions 14 and 15 are used, signal charges in an even number of charge transfer channels are ignored. However, if the accumulation portions are not paired, signal charges in an odd number of charge transfer channels may be ignored.

When the influence of the non-signal portions of the charge transfer channels $1_B$ to $22_B$ is emphasized like in a case wherein the signal charges are small and the number of times of accumulation in the circulating shift register 18 is large, the number of charge transfer channels corresponding to the signal charges to be ignored upon calculations is increased. Accordingly, even when the charge transfer efficiency is less than 100%, a false received-light image can be prevented from being generated, and the position of a received-light image can be accurately obtained. Based on the obtained position, the distance to the object can be accurately calculated.

[FOURTH EMBODIMENT]

The fourth embodiment of the present invention will be described below.

In a distance measuring device of this embodiment, at least one dummy pixel is arranged adjacent to the pixels of a sensor array, so that the same external light as that irradiated onto the pixels of the sensor array is incident on the dummy pixel, and the signal charge in the dummy pixel is ignored upon distance measurement calculations. More specifically, in a signal processing unit of a distance measuring device having the structure shown in FIG. 11, a received-light image formed by signal components reflected by the object is limited to fall within the range from the pixel $S_3$ to the pixel $S_{10}$ of the sensor array 11, the pixels $S_1$ and $S_2$ corresponding to the charge transfer channels adjacent to non-signal portions are used as dummy pixels (on which no received-light image is formed), and signal charges in these dummy pixels are not used in distance measurement calculations.

When signal charges in the pixels $S_1$ and $S_2$ are transferred to the circulating shift register 18 and are repetitively accumulated, if the charge transfer efficiency is less than 100%, signal charges in the charge transfer channels $3_B$ to $6_B$ within the ranges of the pixels $S_1$ and $S_2$ overflow under the influence of the non-signal portions $1_B$ and $2_B$ of the charge transfer channels $1_B$ to $22_B$ since these channels are adjacent to the non-signal portions. However, since the pixels $S_1$ and $S_2$ are used as dummy pixels and their signal charges are ignored in distance measurement calculations, the influence of these pixels does not extend beyond the pixel $S_2$, and the distance measurement calculation result is not influenced.

Figure 15B:
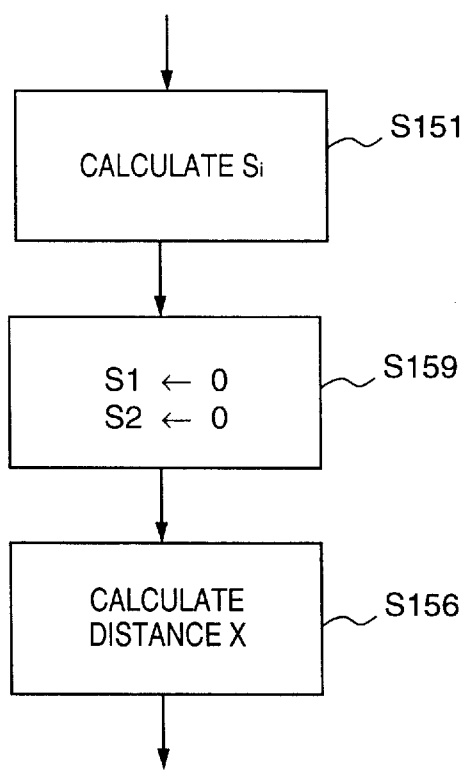
Figure 16A:
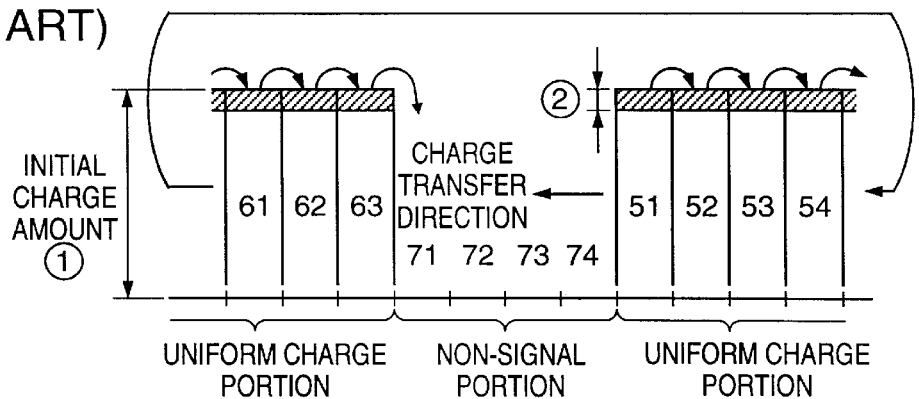
FIGS. 16A to 16D are views for explaining the problems of a conventional distance measuring device.
Figure 16B:
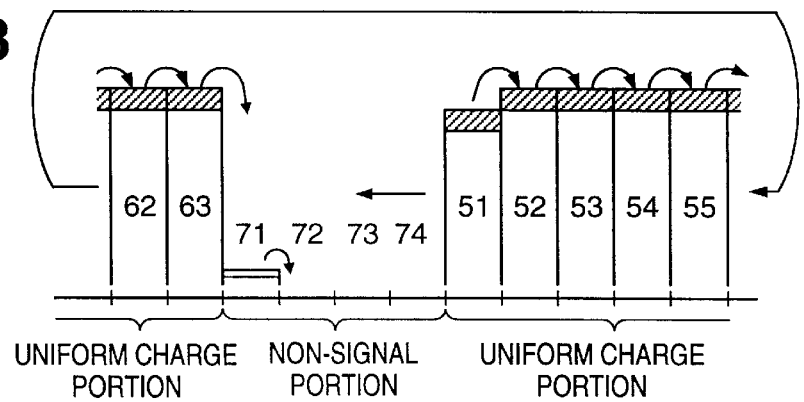
Figure 16C:
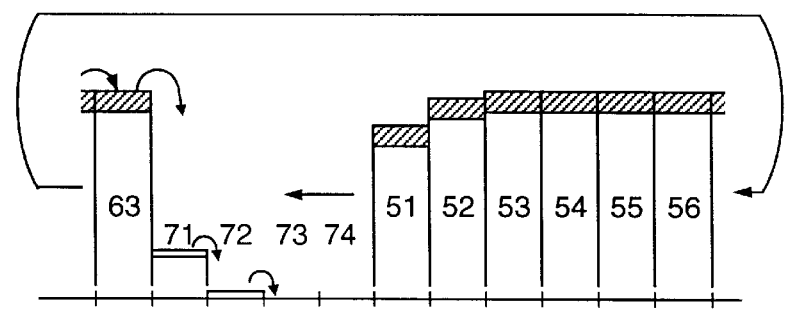
Figure 16D:
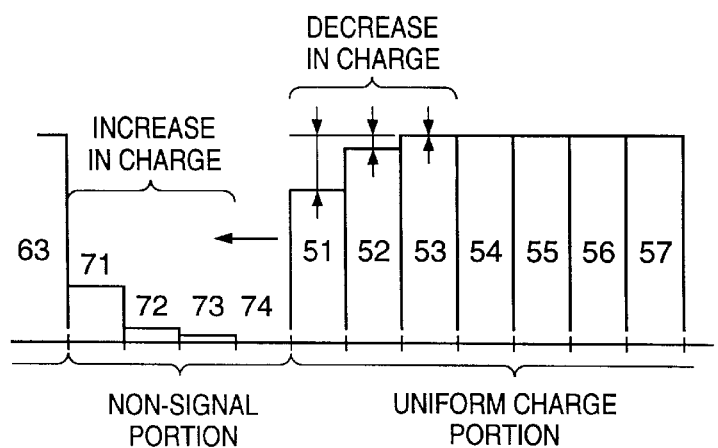

More specifically, step S159 in FIG. 15B may replace steps S152 to S155 in FIG. 15A. In this case, the values $S_1$ and $S_2$ are ignored unconditionally upon calculating the distance X. Alternatively, in place of changing the values $S_i$, the distance X may be calculated without using the values $S_1$ and $S_2$ in calculating the peak position in step S156. In this case, the sensors $S_1$ and $S_2$ are not used in distance measurements at all.

As described above, in the distance measuring device of this embodiment, the pixels $S_1$ and $S_2$ that serve as dummy pixels, the signal charge amounts of which are ignored in the distance measurement calculations, are arranged adjacent to the pixels $S_3$ to $S_{10}$, which are required for the distance measurements, and charges in the charge transfer channels $3_B$ to $6_B$ corresponding to these dummy pixels $S_1$ and $S_2$ are ignored in the distance measurement calculations to prevent signal charges used in the distance measurement calculations from being influenced by signal charges in the non-signal portions $1_B$ and $2_B$ since these channels are adjacent to the non-signal portions $1_B$ and $2_B$ in the circulating shift register 18, thus obtaining an accurate distance to the object.

Also, in a distance measuring device which uses a light projection means for repetitively projecting light beam pulses toward the object to be measured and a circulating shift register for repetitively accumulating signal charges generated by a plurality of photoelectric conversion elements that receive the light beam pulses reflected by the object to be measured, signal charges in some charge transfer channels adjacent to non-signal portions of the charge transfer channels are ignored upon executing distance measurement calculations. Hence, even when the charge transfer efficiency in the charge transfer channels is less than 100%, the distance to the object to be measured can be accurately calculated while eliminating the influence of the non-signal portions.

When the influence of the non-signal portions is large, the number of charge transfer channels corresponding to the signal charges to be ignored is increased. On the other hand, when the influence is small, the number of charge transfer channels corresponding to the signal charges to be ignored is decreased. In this manner, the number of signal charges to be ignored is varied in correspondence with the accumulation state of signal charges. With this control, since the signal level is large especially for the object to be measured present at near distance, the number of times of accumulation can be reduced as well as the number of signal charges to be ignored. Accordingly, the effective regions of the photoelectric conversion elements can be broadened, and hence, the distance measurement range can also be broadened.

On the other hand, when dummy photoelectric conversion elements are arranged adjacent to the photoelectric conversion elements that cover the distance measurement range, and charge transfer channels corresponding the dummy photoelectric conversion elements are arranged adjacent to the non-signal portions in the circulating shift register, the influence of the non-signal portions can be prevented from extending beyond the charge transfer channels of the dummy photoelectric conversion elements. In this way, signal charges used in distance measurements can be prevented from being influenced by the non-signal portions. In addition, since signals from the dummy photoelectric conversion elements can always be ignored, the distance measurement calculations can be simplified.

As many apparently widely different embodiments of the present invention can be made without departing from the spirit and scope thereof, it is to be understood that the invention is not limited to the specific embodiments thereof except as defined in the appended claims.

What is claimed is:

1. A circulating shift register for circulating a charge, comprising:

a plurality of charge transfer channels having a loop portion, at least a portion of which is arranged in a loop pattern;

a clock generation portion for applying a transfer clock to said plurality of charge transfer channels to transfer the charge in a predetermined direction;

an output portion for outputting a signal corresponding to a charge amount in the predetermined charge transfer channel of said plurality of charge transfer channels as an output signal; and a control portion for controlling said clock generation portion to set a frequency of the transfer clock output while said output portion outputs the output signal to be lower than a frequency while said output portion does not output the output signal.

2. The device according to claim 1, wherein said output portion includes an A/D converter to convert the signal as a digital signal, and wherein said control portion controls said clock generation portion to set the frequency of the transfer clock so as to match the frequency with the conversion rate of the A/D converter.

3. The shift register according to claim 1, further comprising a charge injection portion for injecting an externally supplied charge to another predetermined charge transfer channel of said plurality of charge transfer channels, and wherein said control portion controls said charge injection portion not to inject the charge to the charge transfer channel while said output portion outputs the signal.

4. The shift register according to claim 3, wherein said charge injection portion injects the charge in synchronism with circulation of the charge in the loop portion, and the charge injected from said charge injection portion is accumulated by the charge transfer channel.

5. The shift register according to claim 1, further comprising a skim portion for time-serially skimming a predetermined amount of charge in another predetermined charge transfer channel in the loop portion.

6. The shift register according to claim 5, wherein said control portion controls said skim portion not to skim the charge while said output portion outputs the signal.

7. A distance measuring device for measuring a distance to an object, comprising:

an imaging portion for forming an image of light reflected by the object on an array of a plurality of photoelectric conversion elements;

a charge shift portion for shifting charges corresponding to the image supplied from the photoelectric conversion elements in a predetermined direction of the photoelectric conversion elements;

a signal output portion for outputting values corresponding to the charges shifted by said charge shift portion; and a distance calculation portion for removing the value corresponding to the charge supplied from at least one photoelectric conversion the element at an end in the shift direction from the values output from said signal output portion in accordance with a predetermined condition, calculating a position of the image of the object on the photoelectric conversion elements on the basis of the remaining values, and calculating the distance to the object on the basis of the calculated position.

8. The device according to claim 7, wherein said distance calculation portion unconditionally removes the value corresponding to the charge supplied from said at least one photoelectric conversion element at the end in the shift direction, calculates the position of the image of the object on the photoelectric conversion elements on the basis of the remaining values, and calculates the distance to the object on the basis of the calculated position.

9. The device according to claim 7, wherein said charge shift portion includes a loop portion for circulating the shifted charges, and said distance calculation portion removes the value corresponding to the charge supplied from said at least one photoelectric conversion element at the end in the shift direction when the number of times of circulation of the charges around the loop portion becomes not less than a predetermined value, calculates the position of the image of the object on the photoelectric conversion elements on the basis of the remaining values, and calculates the distance to the object on the basis of the calculated position.

10. The device according to claim 9, wherein said distance calculation portion changes the number of photoelectric conversion elements corresponding to the value to be removed, in accordance with the number of times of circulation of the charges around the loop portion.

11. The device according to claim 9, further comprising a light projection portion for projecting light onto the object by repeating flickering every time the charges go around the loop portion, and wherein each of said photoelectric conversion elements supplies a charge corresponding to an image including reflected light of the light projected from said light projection portion and a charge corresponding to an image including no reflected light to said charge shift portion, and said distance calculation portion calculates a difference between values corresponding to the two different charges to obtain a position of an image formed by only light projected from said light projection portion, and calculates the distance to the object on the basis of the obtained position.

12. The device according to claim 7, wherein said imaging portion forms images of the object at least at two positions separated by a predetermined distance, said charge shift portion shifts charges corresponding to the images at the two positions, and said distance calculation portion calculates the distance on the basis of values corresponding to the images at the two positions.

* * * * *

UNITED STATES PATENT AND TRADEMARK OFFICE
CERTIFICATE OF CORRECTION

PATENT NO.   : 5,848,305  Page 1 of 2
DATED        : December 8, 1998
INVENTOR(S)  : Minoru Takasaki It is certified that error appears in the above-identified patent and that said Letters Patent is hereby corrected as shown below:

On the title page, item[56] References Cited, add -- U.S. Patent 5,758,210 --

Column 11, line 35-36, delete "ext- compo light components," and insert therefor -- external light components, --.

Column 13, line 7, delete "Xl" and insert therefor -- X$\ell$ --.

Column 13, line 25, delete "Xl" and insert therefore -- Xr --.

Column 13, line 30, delete "Xl" and insert therefor -- X$\ell$ --.

Column 13, line 30, delete "be t he" and insert therefor -- be the --.

Column 13, line 41, delete "Xl" and insert therefor -- X$\ell$ --.

Column 13, line 45, equation 3, delete "D=B f/(Xl - Xr)" and insert therefor -- $D = B \cdot f / (X\ell - Xr)$ --

Column 13, line 50, delete "Xl" and insert therefor -- X$\ell$ --.

Column 15, line 67, delete "$S_2$" and insert therefor -- $S_1$ --.

UNITED STATES PATENT AND TRADEMARK OFFICE
CERTIFICATE OF CORRECTION

PATENT NO. : 5,848,305

DATED : December 8, 1998

INVENTOR(S) : Minoru Takasaki

It is certified that error appears in the above-identified patent and that said Letters Patent is hereby corrected as shown below:

Column 16, line 27, delete "Xl" and insert therefor -- $X\ell$ --.

Column 16, line 31, delete "Xl" and insert therefor -- $X\ell$ --.

Column 19, line 1, delete "Xl" and insert therefor -- $X\ell$ --.

Column 19, line 4-5 equation 3, delete "D=B f/(Xl - Xr)" and insert therefor -- $D = B \cdot f/(X\ell - Xr)$ --

Column 19, line 8, delete "$Th_1$" and insert therefor -- TH1 --.

Column 19, line 9, delete "$TH_1 = 1$" and insert therefor -- TH1 =1 --.

Column 22, line 14, delete "the element" and insert therefor -- element --.

Signed and Sealed this

Fifteenth Day of June, 1999

Attest:

Q. TODD DICKINSON

*Attesting Officer*     *Acting Commissioner of Patents and Trademarks*